United States Patent
Nam et al.

(10) Patent No.: US 9,276,726 B2
(45) Date of Patent: Mar. 1, 2016

(54) TRANSMISSIONS/RECEPTIONS OF UPLINK ACKNOWLEDGEMENT SIGNALS IN WIRELESS NETWORKS

(71) Applicant: Samsung Electronics Co., LTD, Suwon-si, Gyeonggi-do (KR)

(72) Inventors: Young-Han Nam, Plano, TX (US); Boon Loong Ng, Dallas, TX (US); Aris Papasakellariou, Houston, TX (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 137 days.

(21) Appl. No.: 14/099,676

(22) Filed: Dec. 6, 2013

(65) Prior Publication Data

US 2014/0161060 A1    Jun. 12, 2014

Related U.S. Application Data

(60) Provisional application No. 61/735,870, filed on Dec. 11, 2012, provisional application No. 61/862,349, filed on Aug. 5, 2013.

(51) Int. Cl.
| | |
|---|---|
| *H04W 52/40* | (2009.01) |
| *H04L 5/00* | (2006.01) |
| *H04W 52/10* | (2009.01) |
| *H04W 52/08* | (2009.01) |
| *H04W 52/14* | (2009.01) |

(Continued)

(52) U.S. Cl.
CPC .......... *H04L 5/0055* (2013.01); *H04W 52/40* (2013.01); *H04L 5/001* (2013.01); *H04L 5/0035* (2013.01); *H04W 52/08* (2013.01); *H04W 52/10* (2013.01); *H04W 52/146* (2013.01); *H04W 52/242* (2013.01); *H04W 52/325* (2013.01)

(58) Field of Classification Search
CPC ..... H04L 5/0055; H04L 5/0035; H04L 5/001; H04W 52/08; H04W 52/10; H04W 52/146; H04W 52/242; H04W 52/325; H04W 52/40
See application file for complete search history.

(56) References Cited

U.S. PATENT DOCUMENTS

| | | | | |
|---|---|---|---|---|
| 2008/0280638 | A1* | 11/2008 | Malladi et al. | 455/522 |
| 2011/0111788 | A1* | 5/2011 | Damnjanovic et al. | 455/522 |

(Continued)

OTHER PUBLICATIONS

Panasonic, "Multiplexing of periodic CSI and HARQ-ACK for carrier aggregation", May 21-25, 2012, 3GPP TSG-RAN WG1 Meeting #69, R1-122172, pp. 1-3.*

(Continued)

*Primary Examiner* — Paul H Masur

(57) ABSTRACT

An apparatus for use in a wireless communication network includes a UE configured to communicate with a plurality of serving cells with at least a first serving cell and a second serving cell. The UE is configured to operate in at least two carrier frequencies. The UE includes processing circuitry. The processing circuitry is configured to detect one or more scheduling assignments for receiving one or more respective PDSCHs from a respective one or more of the plurality of serving cells. The processing circuitry is also configured to receive the one or more PDSCHs from the respective one or more of the plurality of serving cells based on the one or more scheduling assignments. The processing circuitry is further configured to transmit HARQ-ACK information on a PUCCH in response to receiving the one or more PDSCHs. The processing circuitry is configured to utilize first and second power control loops.

20 Claims, 18 Drawing Sheets

(51) Int. Cl.
*H04W 52/24* (2009.01)
*H04W 52/32* (2009.01)

(56) References Cited

U.S. PATENT DOCUMENTS

| | | | |
|---|---|---|---|
| 2011/0250899 A1* | 10/2011 | Vajapeyam et al. | 455/450 |
| 2012/0213170 A1 | 8/2012 | Choi et al. | |
| 2012/0275425 A1* | 11/2012 | Li et al. | 370/329 |
| 2014/0029584 A1* | 1/2014 | Qu et al. | 370/336 |
| 2015/0023263 A1* | 1/2015 | Son et al. | 370/329 |

OTHER PUBLICATIONS

Samsung, "Pcell vs. Scell based timing in case of PDSCH cross-carrier scheduling", May 21-25, 2012, 3GPP TSG-RAN WG1 Meeting #69, R1-122224, pp. 1-2.*
Samsung, "Pcell vs. Scell based PDSCH HARQ timing in case of cross-carrier scheduling", Aug. 13-17, 2012, 3GPP TSG RAN WG1 #70, R1-123450, pp. 1-2.*
Pantech, "Remaining PDSCH HARQ timing on SCell for inter-band CA TDD", Aug. 13-17, 2012, 3GPP TSG RAN1 #70, R1-123319, pp. 1-4.*
Panasonic, "Multiplexing of periodic CSI and HARQ-ACK for carrier aggregation", Aug. 13-17, 2012, 3GPP TSG-RAN WG1 Meeting #70, R1-123268, pp. 1-2.*
International Search Report dated Apr. 4, 2014 in connection with International Patent Application No. PCT/KR2013/011425, 3 pages.
Written Opinion of International Searching Authority dated Apr. 4, 2014 in connection with International Patent Application No. PCT/KR2013/011425, 6 pages.
3GPP TSG RAN WG1 Meeting #70B; "DCI Design for TM10"; R1-124235; Oct. 8-12, 2012; San Diego, USA; 7 pages.
3GPP TSG RAN WG1 Meeting #70B; "PUCCH resource allocation"; R1-124122; Oct. 8-12, 2012; San Diego, USA; 5 pages.
3GPP TSG RAN WG1 Meeting #71; "Remaining details on PUCCH resource allocation for EPDCCH"; R1-124728; Nov. 12-16, 2012; New Orleans, USA; 6 pages.
3GPP TSG RAN WG1 Meeting #71; "PUCCH resource allocation for carrier aggregation for EPDCCH"; R1-125078; Nov. 12-16, 2012; New Orleans, USA; 3 pages.

* cited by examiner

TRANSMISSIONS/RECEPTIONS OF UPLINK ACKNOWLEDGEMENT SIGNALS IN WIRELESS NETWORKS

CROSS-REFERENCE TO RELATED APPLICATION AND PRIORITY CLAIM

This application claims priority under 35 U.S.C. §119(e) to U.S. Provisional Patent Application Ser. No. 61/735,870 filed on Dec. 11, 2012 and U.S. Provisional Patent Application Ser. No. 61/862,349 filed on Aug. 5, 2013. Both provisional patent applications are hereby incorporated by reference in their entirety.

TECHNICAL FIELD

This application relates generally to wireless communications and, more specifically, to transmissions and receptions of uplink acknowledgement signals.

BACKGROUND

Physical uplink control channel procedures are discussed in Release 10 of the 3GPP Long Term Evolution (LTE) standard, as described in 3GPP Technical Specification No. 36.213 version 10.1.0 Release 10, "Physical layer procedures." Coordinated multi-point (CoMP) transmission and reception have been considered for LTE-Advanced as a way to improve the coverage of high data rates, to improve cell-edge throughput, and to increase system throughput.

When only a primary serving cell transmits physical downlink shared channel data to a user equipment configured with multiple serving cells, the user equipment transmits the corresponding hybrid automatic repeat request and acknowledgment (HARQ-ACK) using physical uplink control channel format 1a/1b. When a secondary serving cell transmits physical downlink shared channel data to the user equipment, the user equipment transmits the corresponding HARQ-ACK using physical uplink control channel format 3.

SUMMARY

This disclosure supports transmissions and receptions of uplink acknowledgement signals.

In a first embodiment, an apparatus for use in a wireless communication network includes a user equipment (UE). The UE is configured to communicate with a plurality of serving cells including a first serving cell and a second serving cell. The UE is configured to operate in at least two carrier frequencies. The UE includes processing circuitry. The processing circuitry is configured to detect one or more scheduling assignments for receiving one or more respective physical downlink shared channels (PDSCHs) from a respective one or more of the plurality of serving cells. The processing circuitry is also configured to receive the one or more PDSCHs from the respective one or more of the plurality of serving cells based on the one or more scheduling assignments. The processing circuitry is further configured to transmit hybrid automatic repeat request acknowledgment (HARQ-ACK) information on a physical uplink control channel (PUCCH) in response to receiving the one or more PDSCHs. The processing circuitry is configured to utilize a first power control loop to determine an uplink transmission power for the PUCCH when the UE receives PDSCH only from the first serving cell. The first power control loop is configured to use a path-loss reference derived from a received power of a reference signal transmitted in the first serving cell, a transmission power control (TPC) command of a TPC field included in a scheduling assignment for the PDCCH reception in the first serving cell, and a first set of open loop power control parameters. The processing circuitry is also configured to utilize a second power control loop to determine an uplink transmission power for the PUCCH when the UE receives PDSCH at least from the second serving cell. The second power control loop is configured to use a path-loss reference derived from a received power of a reference signal transmitted in the second serving cell, a TPC command of a TPC field included in a scheduling assignment for the PDCCH reception in the second serving cell, and a second set of open loop power control parameters.

In a second embodiment, a method for managing a hybrid automatic repeat request acknowledgment in a wireless network includes operating a user equipment (UE) in at least two carrier frequencies. The method also includes detecting one or more scheduling assignments for receiving one or more respective physical downlink shared channels (PDSCHs) from a respective one or more of the plurality of serving cells and receiving the one or more PDSCHs from the respective one or more of the plurality of serving cells based on the one or more scheduling assignments. The method further includes transmitting hybrid automatic repeat request acknowledgment (HARQ-ACK) information on a physical uplink control channel (PUCCH) in response to receiving the one or more PDSCHs. The method also includes utilizing a first power control loop to determine an uplink transmission power for the PUCCH when the UE receives PDSCH only from the first serving cell. The first power control loop uses a path-loss reference derived from a received power of a reference signal transmitted in the first serving cell, a transmission power control (TPC) command of a TPC field included in a scheduling assignment for the PDCCH reception in the first serving cell, and a first set of open loop power control parameters. In addition, the method includes utilizing a second power control loop to determine an uplink transmission power for the PUCCH when the UE receives PDSCH at least from the second serving cell. The second power control loop uses a path-loss reference derived from a received power of a reference signal transmitted in the second serving cell, a TPC command of a TPC field included in a scheduling assignment for the PDCCH reception in the second serving cell, and a second set of open loop power control parameters.

In a third embodiment, a non-transitory computer readable medium embodies computer readable program code for performing a method. The method includes operating a user equipment (UE) in at least two carrier frequencies. The method also includes detecting one or more scheduling assignments for receiving one or more respective physical downlink shared channels (PDSCHs) from a respective one or more of the plurality of serving cells and receiving the one or more PDSCHs from the respective one or more of the plurality of serving cells based on the one or more scheduling assignments. The method further includes transmitting hybrid automatic repeat request acknowledgment (HARQ-ACK) information on a physical uplink control channel (PUCCH) in response to receiving the one or more PDSCHs. The method also includes utilizing a first power control loop to determine an uplink transmission power for the PUCCH when the UE receives PDSCH only from the first serving cell. The first power control loop uses a path-loss reference derived from a received power of a reference signal transmitted in the first serving cell, a transmission power control (TPC) command of a TPC field included in a scheduling assignment for the PDCCH reception in the first serving cell, and a first set of open loop power control parameters. In addition, the method includes utilizing a second power control loop to determine an uplink transmission power for the PUCCH when the UE receives PDSCH at least from the second serving cell. The second power control loop uses a path-loss reference derived from a received power of a reference signal transmitted in the second serving cell, a TPC command of a TPC field included in a scheduling assignment for the PDCCH reception in the second serving cell, and a second set of open loop power control parameters.

Before undertaking the DETAILED DESCRIPTION below, it may be advantageous to set forth definitions of certain words and phrases used throughout this patent document. The terms "include" and "comprise," as well as derivatives thereof, mean inclusion without limitation. The term "or" is inclusive, meaning "and/or." The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. It should be noted that the functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: "A," "B," "C," "A and B," "A and C," "B and C," and "A and B and C." Definitions for certain other words and phrases are provided throughout this patent document, and those of ordinary skill in the art should understand that in many if not most instances, such definitions apply to prior as well as future uses of such defined words and phrases. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 14, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communications system.

The following documents and standards descriptions are hereby incorporated into this disclosure in their entirety:
  3GPP TS 36.211 v10.5.0, "E-UTRA, Physical channels and modulation" ("REF1");
  3GPP TS 36.212 v10.5.0, "E-UTRA, Multiplexing and Channel coding" ("REF2");
  3GPP TS 36.213 v10.5.0, "E-UTRA, Physical Layer Procedures" ("REF3"); and
  Draft 3GPP TR 36.932 v0.1.0, "Scenarios and Requirements for Small Cell Enhancement for E-UTRA and E-UTRAN" ("REF4").

Figure 1:
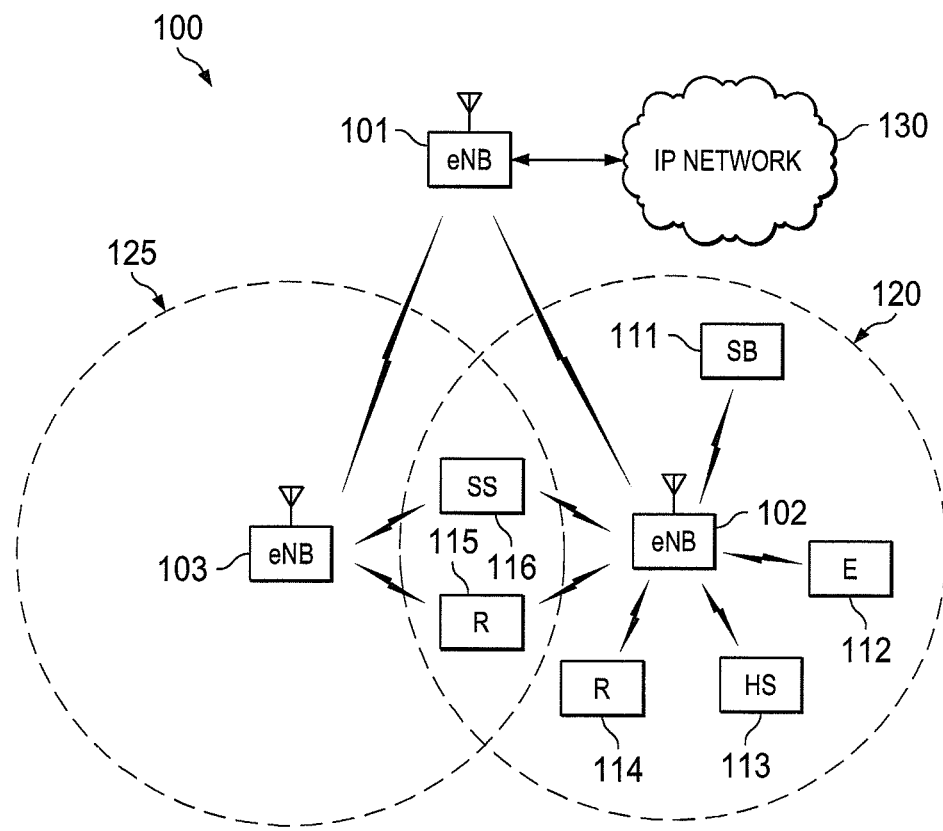
FIG. 1 illustrates an example wireless network according to this disclosure.

FIG. 1 illustrates an example wireless network 100 according to this disclosure. As shown in FIG. 1, the wireless network 100 includes an eNodeB (eNB) 101, eNB 102, and eNB 103. The eNB 101 communicates with eNB 102 and eNB 103. The eNB 101 also communicates with Internet protocol (IP) network 130, such as the Internet, a proprietary IP network, or other data network.

Depending on the network type, other well-known terms may be used instead of "eNodeB," such as "base station" or "access point." For the sake of convenience, the terms "eNodeB" and "eNB" refer to network infrastructure components that provide wireless access to remote terminals. In addition, the term "user equipment" or "UE" designates any remote wireless equipment that wirelessly accesses an eNB and that can be used by a consumer to access services via the wireless communications network, whether the UE is a mobile device (such as a cell phone) or is normally considered a stationary device (such as a desktop personal computer, vending machine, and/or the like). Other well-known terms for user equipment include "mobile stations," "subscriber stations," "remote terminals," "wireless terminals," and the like.

The eNB 102 provides wireless broadband access to network 130 to a first plurality of user equipments (UEs) within coverage area 120 of eNB 102. The first plurality of UEs includes UE 111, which may be located in a small business (SB); UE 112, which may be located in an enterprise (E); UE 113, which may be located in a WiFi hotspot (HS); UE 114, which may be located in a first residence (R); UE 115, which may be located in a second residence (R); and UE 116, which may be a mobile device (SS), such as a cell phone, a wireless laptop, a wireless PDA, or the like.

The eNB 103 provides wireless broadband access to a second plurality of UEs within coverage area 125 of eNB 103. The second plurality of UEs includes UE 115 and UE 116. In some embodiments, one or more of eNBs 101-103 may communicate with each other and with UEs 111-116 using 5G, LTE, LTE-A, or WiMAX techniques, including techniques for hybrid ad-hoc/network assisted device discovery for device-to-device communications.

Dotted lines show the approximate extents of coverage areas 120 and 125, which are shown as approximately circular for the purposes of illustration and explanation only. It should be clearly understood that the coverage areas associated with eNBs, such as coverage areas 120 and 125, may have other shapes, including irregular shapes, depending upon the configuration of the eNBs and variations in the radio environment associated with natural and man-made obstructions.

Although FIG. 1 illustrates one example of a wireless network 100, various changes may be made to FIG. 1. For example, the network 100 could include any number of eNBs and any number of UEs in any suitable arrangement. Also, the eNB 101 could communicate directly with any number of UEs and provide those UEs with wireless broadband access to the network 130. Further, the eNB 101 could provide access to other or additional external networks, such as an external telephone network. In addition, the makeup and arrangement of the wireless network 100 is for illustration only.

Figure 2A:
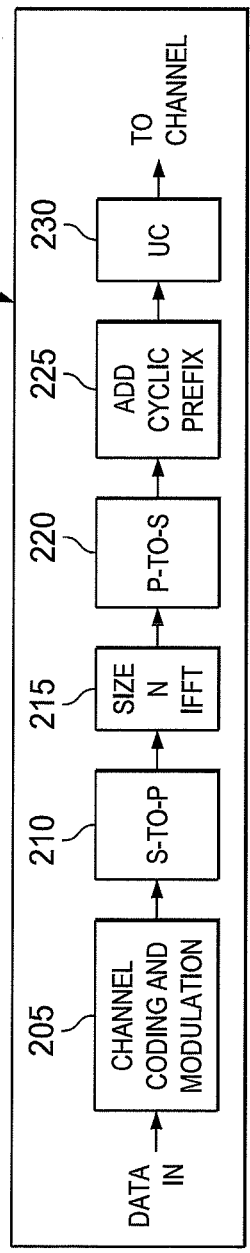
FIGS. 2A and 2B illustrate example high-level diagrams of a wireless transmit path and a wireless receive path according to this disclosure.
Figure 2B:
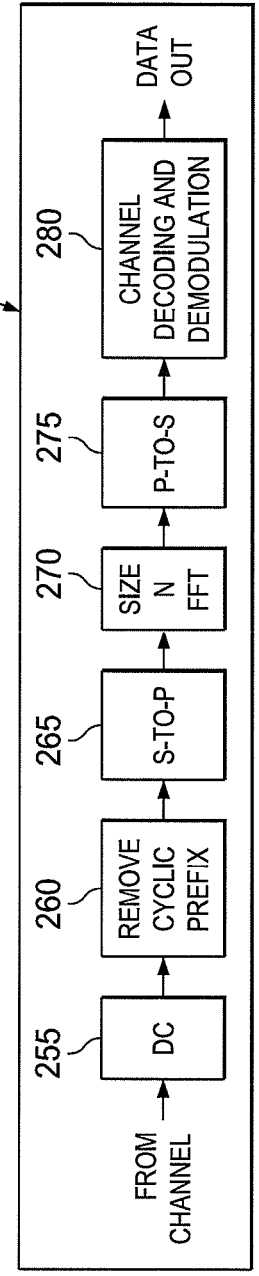

FIGS. 2A and 2B illustrate example high-level diagrams of a wireless transmit path 200 and a wireless receive path 250 according to this disclosure. In FIG. 2A, the transmit path 200 may be implemented in an eNB, such as eNB 102 of FIG. 1. In FIG. 2B, the receive path 250 may be implemented in a UE, such as UE 116 of FIG. 1. It will be understood, however, that the receive path 250 could be implemented in an eNB (such as eNB 102 of FIG. 1) and that the transmit path 200 could be implemented in a UE. In some embodiments, the transmit path 200 and receive path 250 are configured to perform methods for hybrid ad-hoc/network assisted device discovery for device-to-device communications as described in embodiments of this disclosure.

The transmit path 200 includes channel coding and modulation block 205, serial-to-parallel (S-to-P) block 210, size N Inverse Fast Fourier Transform (IFFT) block 215, parallel-to-serial (P-to-S) block 220, add cyclic prefix block 225, and up-converter (UC) 230. The receive path 250 includes down-converter (DC) 255, remove cyclic prefix block 260, serial-to-parallel (S-to-P) block 265, size N Fast Fourier Transform (FFT) block 270, parallel-to-serial (P-to-S) block 275, and channel decoding and demodulation block 280.

In some embodiments, at least some of the components in FIGS. 2A and 2B may be implemented in software, while other components may be implemented by configurable hardware or a mixture of software and configurable hardware. As particular examples, it is noted that the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

In the transmit path 200, the channel coding and modulation block 205 receives a set of information bits, applies coding (such as LDPC coding), and modulates the input bits (such as with Quadrature Phase Shift Keying (QPSK) or Quadrature Amplitude Modulation (QAM)) to produce a sequence of frequency-domain modulation symbols. The serial-to-parallel block 210 converts (such as de-multiplexes) the serial modulated symbols to parallel data to produce N parallel symbol streams, where N is the IFFT/FFT size used in eNB 102 and UE 116. The size N IFFT block 215 performs an IFFT operation on the N parallel symbol streams to produce time-domain output signals. The parallel-to-serial block 220 converts (such as multiplexes) the parallel time-domain output symbols from the size N IFFT block 215 to produce a serial time-domain signal. The add cyclic prefix block 225 inserts a cyclic prefix to the time-domain signal. The up-converter 230 modulates (such as up-converts) the output of the add cyclic prefix block 225 to RF frequency for transmission via a wireless channel. The signal may also be filtered at baseband before conversion to RF frequency.

The transmitted RF signal arrives at the UE 116 after passing through the wireless channel, and reverse operations to those at the eNB 102 are performed. The down-converter 255 down-converts the received signal to baseband frequency, and the remove cyclic prefix block 260 removes the cyclic prefix to produce the serial time-domain baseband signal. The serial-to-parallel block 265 converts the time-domain baseband signal to parallel time domain signals. The size N FFT block 270 performs an FFT algorithm to produce N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path that is analogous to transmitting in the downlink to UEs 111-116 and may implement a receive path that is analogous to receiving in the uplink from UEs 111-116. Similarly, each of UEs 111-116 may implement a transmit path corresponding to the architecture for transmitting in the uplink to eNBs 101-103 and may implement a receive path corresponding to the architecture for receiving in the downlink from eNBs 101-103.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs.

Figure 3:
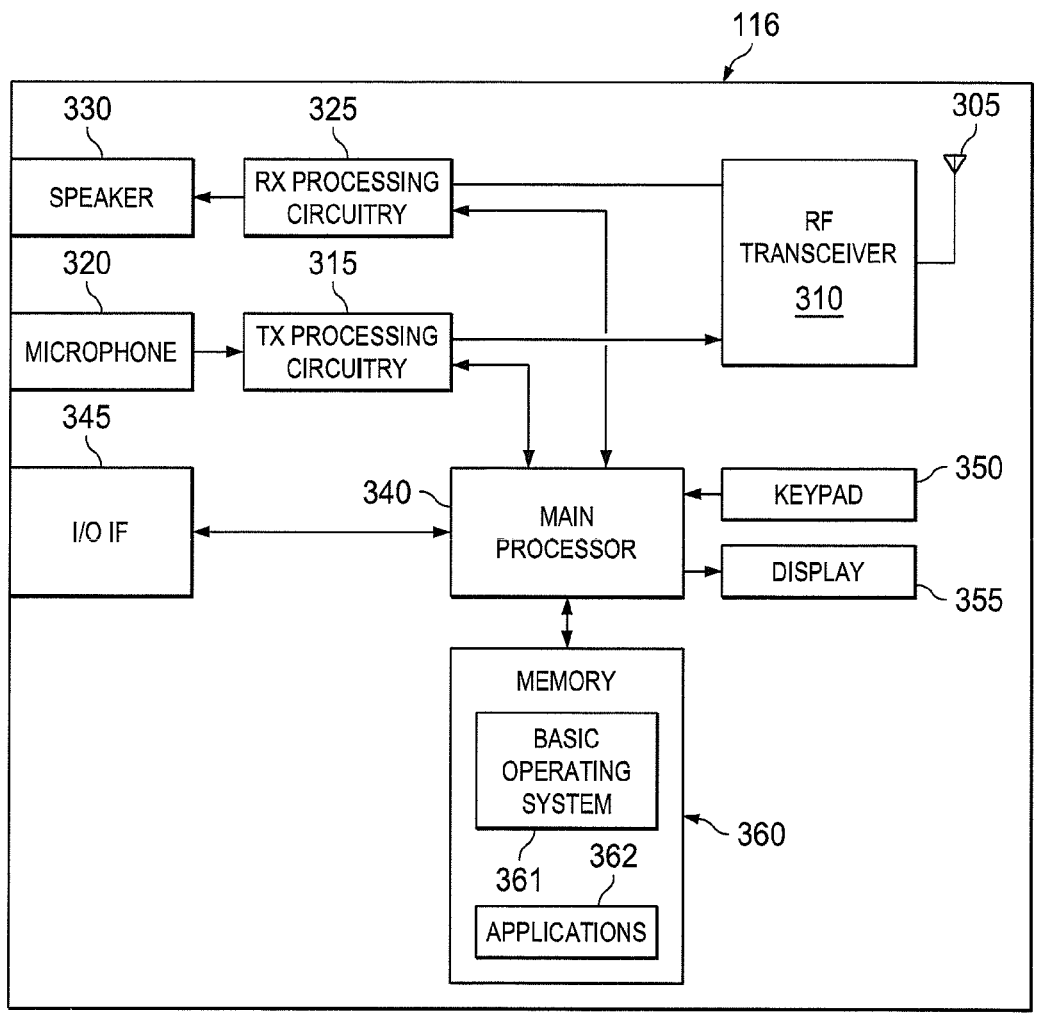
FIG. 3 illustrates an example user equipment according to this disclosure.

FIG. 3 illustrates an example user equipment according to this disclosure. The embodiment of the user equipment, such as UE 116, illustrated in FIG. 3 is for illustration only. The UEs 111-115 of FIG. 1 could have the same or similar configuration. Note, however, that UEs come in a wide variety of configurations and that FIG. 3 does not limit this disclosure to any particular implementation of a UE.

As shown in FIG. 3, the UE 116 includes an antenna 305, radio frequency (RF) transceiver 310, transmit (TX) processing circuitry 315, microphone 320, and receive (RX) processing circuitry 325. The UE 116 also includes a speaker 330, main processor 340, input/output (I/O) interface (IF) 345, keypad 350, display 355, and memory 360. The memory 360 includes a basic operating system (OS) program 361 and a plurality of applications 362. The plurality of applications 362 can include one or more of resource mapping tables (such as in Tables 1-10 described in further detail below).

The RF transceiver 310 receives, from the antenna 305, an incoming RF signal transmitted by an eNB of the network 100. The RF transceiver 310 down-converts the incoming RF signal to produce an intermediate frequency (IF) or a baseband signal. The IF or baseband signal is sent to the RX processing circuitry 325, which produces a processed baseband signal by filtering, decoding, and/or digitizing the baseband or IF signal. The RX processing circuitry 325 transmits the processed baseband signal to the speaker 330 (such as voice data) or to the main processor 340 for further processing (such as web browsing).

The TX processing circuitry 315 receives analog or digital voice data from the microphone 320 or other outgoing baseband data (such as web data, e-mail, interactive video game data) from the main processor 340. The TX processing circuitry 315 encodes, multiplexes, and/or digitizes the outgoing baseband data to produce a processed baseband or IF signal. The RF transceiver 310 receives the outgoing processed baseband or IF signal from the TX processing circuitry 315 and up-converts the baseband or IF signal to an RF signal that is transmitted via the antenna 305.

In some embodiments, the main processor 340 is a microprocessor or microcontroller. The memory 360 is coupled to the main processor 340. Part of the memory 360 could include a random access memory (RAM), and another part of the memory 360 could include a Flash memory or other read-only memory (ROM).

The main processor 340 can include one or more processors and execute the basic OS program 361 stored in the memory 360 in order to control the overall operation of the UE 116. In one such operation, the main processor 340 controls the reception of forward channel signals and the transmission of reverse channel signals by the RF transceiver 310, the RX processing circuitry 325, and the TX processing circuitry 315 in accordance with well-known principles.

The main processor 340 is also capable of executing other processes and programs resident in the memory 360, such as operations for hybrid ad-hoc/network assisted device discovery for device-to-device communications. The main processor 340 can move data into or out of the memory 360 as required by an executing process. In some embodiments, the main processor 340 is configured to execute a plurality of applications 362, such as applications for CoMP communications and MU-MIMO communications. The main processor 340 can operate the plurality of applications 362 based on the OS program 361 or in response to a signal received from an eNB. The main processor 340 is also coupled to the I/O interface 345, which provides UE 116 with the ability to connect to other devices such as laptop computers and handheld computers. The I/O interface 345 is the communication path between these accessories and the main controller 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

Although FIG. 3 illustrates one example of UE 116, various changes may be made to FIG. 3. For example, various components in FIG. 3 could be combined, further subdivided, or omitted and additional components could be added according to particular needs. Also, while FIG. 3 illustrates the UE 116 operating as a mobile telephone, UEs could be configured to operate as other types of mobile or stationary devices.

Figure 4:
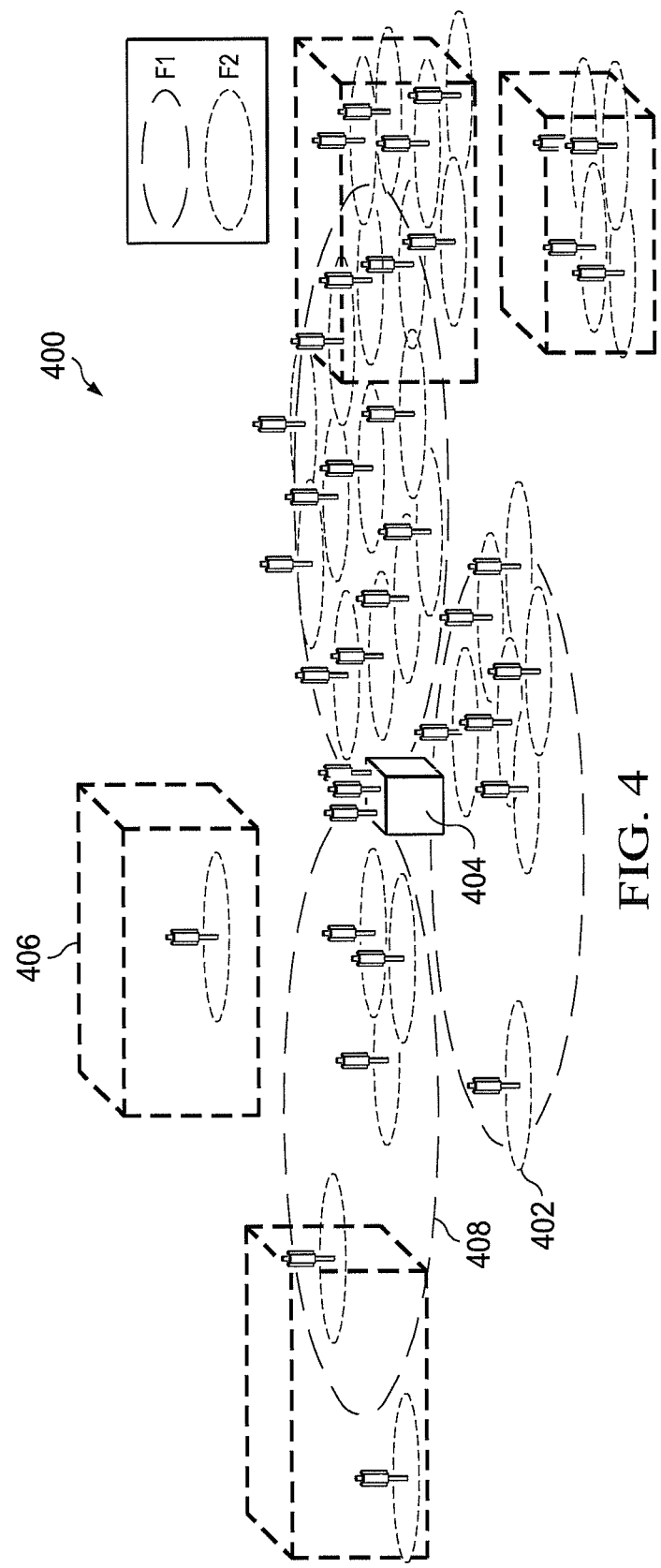
FIG. 4 illustrates an example deployment scenario of small cells and macro cells according to this disclosure.

FIG. 4 illustrates an example deployment scenario 400 of small cells 402 and macro cells 404 according to this disclosure. In some embodiments, regarding small cell enhancement, 3GPP TR 36.932 REF4 describes the target scenarios of a small-cell study. Small cell enhancement may target with and without macro coverage, outdoor and indoor small cell deployments, and ideal and non-ideal backhaul. Both sparse and dense small cell deployments may be considered.

In various embodiments with and without macro coverage, as shown in FIG. 4, small cell enhancement can target the deployment scenario in which small cell nodes are deployed under the coverage of one or more overlaid E-UTRAN macro-cell layer(s) in order to boost the capacity of the already-deployed cellular network. In various embodiments, example scenarios can include:

1) where the UE is in coverage of both the macro cell and the small cell simultaneously; and 2) where the UE is not in coverage of both the macro cell and the small cell simultaneously.

FIG. 4 also shows the scenario where small cell nodes, such as the small cell node in an area 406, are not deployed under the coverage of one or more overlaid E-UTRAN macro-cell layer(s) 408. This scenario may also be the target of the small cell enhancement SI.

Figure 5A:
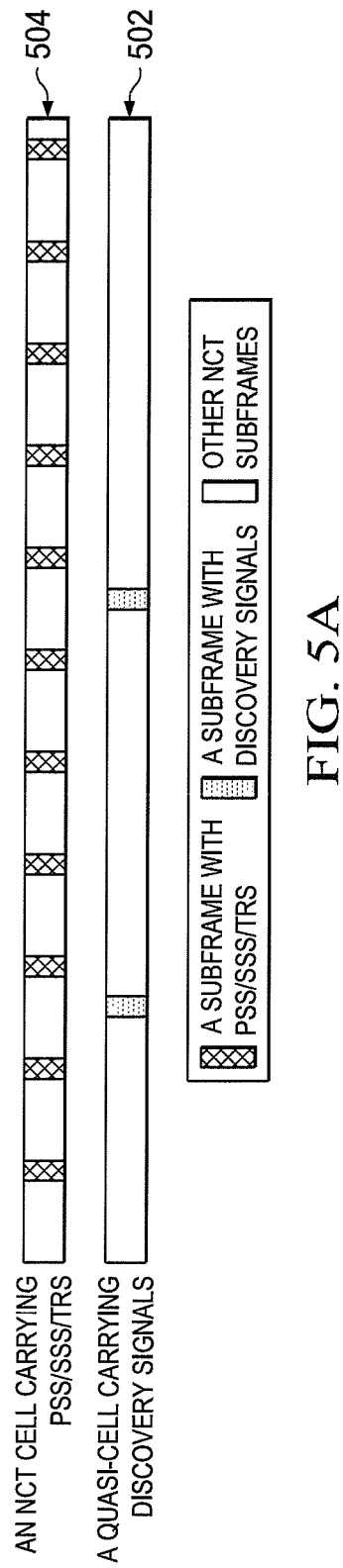
FIGS. 5A and 5B illustrate an example quasi-cell, new carrier type (NCT) cell, and backward compatible cell according to this disclosure.
Figure 5B:
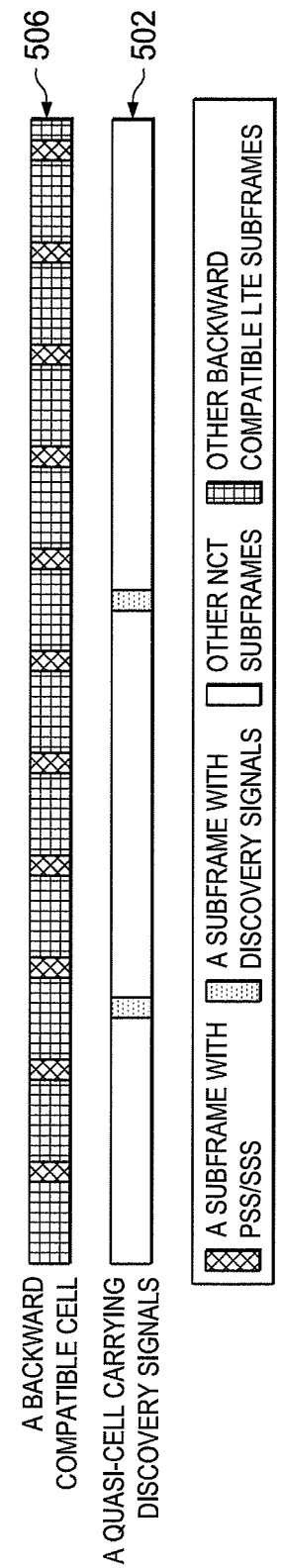

FIGS. 5A and 5B illustrate an example quasi-cell 502, new carrier type (NCT) cell 504, and backward compatible cell 506 according to this disclosure. In some embodiments, the quasi-cell 502 is co-channel-deployed on a carrier (or a carrier frequency) together with cells 504 and 506. The quasi-cell 502 and the cells 504 and 506 may have been placed in two geographically separated locations. Quasi-cell 502 is identified by a quasi-cell specific discovery signal (and discovery identifier or "ID"). An advanced UE can identify quasi-cell 502 by detecting a quasi-cell specific discovery signal, while a legacy UE may not identify quasi-cell 502.

The network can make use of the quasi-cell 502 to transmit physical downlink shared channel (PDSCH) data to both the legacy UE and the advanced UE. When the advanced UE receives PDSCH data from quasi-cell 502, the advanced UE may be aware that it is receiving the PDSCH data from quasi-cell 502. Even when the legacy UE receives PDSCH data from quasi-cell 502, the operation of quasi-cell 502 is transparent to the legacy UE, and the legacy UE does not know the existence of quasi-cell 502 as it operates according to the legacy specification where no specific protocols are defined for the quasi-cells. In some embodiments, quasi-cell 502 may not be a traditional cell, as it does not carry PSS/SSS to be used for identifying the cell and physical cell ID (PCI).

In some embodiments, in 3GPP LTE, there may be a number of downlink (DL) assignment downlink control information (DCI) formats, which convey scheduling information, such as set of scheduled physical resource blocks (PRB)s, transmission rank, set of antenna port numbers, modulation and coding scheme, transmit power control (TPC) command for PUCCH, and the like. Example DL assignment DCI formats can be found in 36.212 REF2, which include DCI format 1A/1C/2/2A/2B/2C/2D. In this disclosure, the phrase "DL assignment DCI format" is used for referring to these DCI formats and variants of them.

In some embodiments, in the legacy RAN2 specification (36.331 v10.5.0), Pcell, Scell and serving cell may be defined in the following manner:

Primary Cell (Pcell): The cell, operating on the primary frequency, in which the UE either performs the initial connection establishment procedure or initiates the connection re-establishment procedure, or the cell indicated as the primary cell in the handover procedure.

Secondary Cell (Scell): A cell, operating on a secondary frequency, which may be configured once an RRC connection is established and which may be used to provide additional radio resources.

Serving Cell: For a UE in RRC_CONNECTED not configured with CA, there is only one serving cell comprising of the primary cell. For a UE in RRC_CONNECTED configured with CA, the term "serving cells" is used to denote the set of one or more cells including the primary cell and all secondary cells.

In some embodiments, in the media access control/radio resource control (MAC/RRC) layer perspective (RAN2), the Pcell (macro) handles mobility and initial access of the UE, while the Scell is used for data transmission/reception. This way, too frequent handover between multiple pico cells can be avoided.

In physical (PHY) layer specifications (RAN1), in some embodiments, the terms Pcell and Scell are adopted to define UE behaviors associated with UL/DL control signaling. Some examples are: PUCCHs are transmitted only in the Pcell; when only the Pcell transmits PDSCH to a UE configured with multiple serving cells, the UE transmits the corresponding HARQ-ACK using PUCCH format 1a/1b; when an Scell transmits PDSCH to the UE, the UE transmits the corresponding HARQ-ACK using PUCCH format 3 (as in Table 1); and common DL control signaling (PDCCH/ePDCCH common search space) is transmitted only in the Pcell.

In various embodiments of this disclosure, the Pcell is defined in Rel-10/11 as the legacy Pcell. A list of acronyms used here includes:
- eNB=enhanced node B
- UE=user equipment
- CA=carrier aggregation
- CoMP=coordinated multi-point
- UL=uplink
- DL=downlink
- PDSCH=physical downlink shared channel
- PUSCH=physical uplink shared channel
- PUCCH=physical uplink control channel
- PDCCH=physical downlink control channel
- ePDCCH=enhanced PDCCH
- RS=reference signal
- CSI-RS=channel-state-information reference signal
- CRS=cell-specific reference signal
- DMRS=demodulation reference signal
- HARQ=Hybrid Automatic repeat-reqest
- ACK=Acknowledgement signal
- DCI=downlink control information
- TPC=transmit power control
- Pcell=primary serving cell
- Scell=secondary serving cell
- RRC=radio resource control (layer)
- TM=transmission mode
- TB=transport block FIGS. 6A through 6D illustrate example inter-eNB CA and CoMP systems 600a-600d according to this disclosure. In FIGS. 6A through 6D, communications occur between a UE 606a-606d and two eNBs, namely eNB 602a-602d and eNB 604a-604d. The eNBs are operating in the same carrier frequency in FIGS. 6C and 6D and in two different carrier frequencies in FIGS. 6A and 6B.

In FIGS. 6A through 6D, one of the two eNBs (cell 1) is a macro eNB, while the other eNB (cell 2) is a pico eNB. However, the concepts in this disclosure can generally apply to two eNBs of any types. The eNBs may be connected with a slow backhaul, where one message transmission from one eNB to the other eNB (or signaling delay between two eNBs) may take more than a few milli-seconds, such as tens of milli-seconds (or subframes).

Figure 6A:
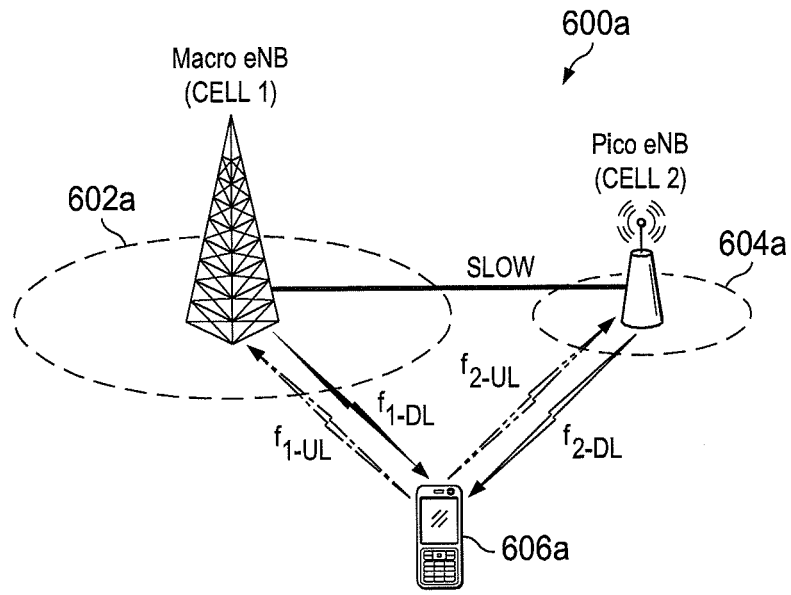
FIGS. 6A through 6D illustrate example inter-eNodeB (eNB) carrier aggregation (CA) and coordinated multi-point (CoMP) systems according to this disclosure.

FIG. 6A illustrates a frequency division duplex (FDD) inter-eNB CA system 600a. The system 600a includes eNBs 602a and 604a and UE 606a. In system 600a, UE 606a is configured with two serving cells on two different carrier frequencies. The UE 606a transmits and receives signals to/from the macro eNB 602a on carrier frequencies f1-DL and f1-UL, respectively. The UE 606a transmits and receives signals to/from the pico eNB 604a on carrier frequencies f2-DL and f2-UL, respectively.

Figure 6B:
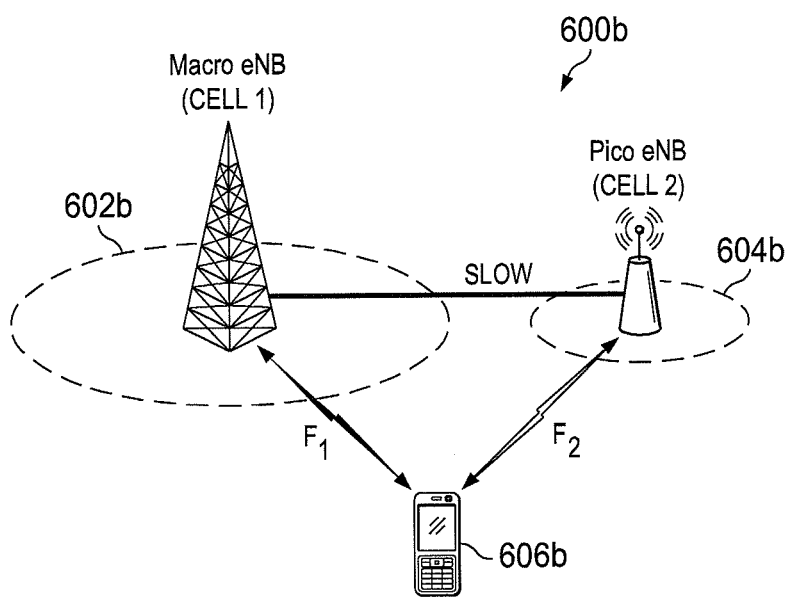

FIG. 6B illustrates a time division duplex (TDD) inter-eNB CA system 600b. The system 600b includes eNBs 602b and 604b and UE 606b. In some embodiments, in system 600b, UE 606b is configured with two serving cells on two different carrier frequencies. The UE 606b transmits and receives signals to/from the macro eNB 602b on carrier frequencies F1, and the UE 606b transmits and receives signals to/from the pico eNB 604b on carrier frequencies F2.

Figure 6C:
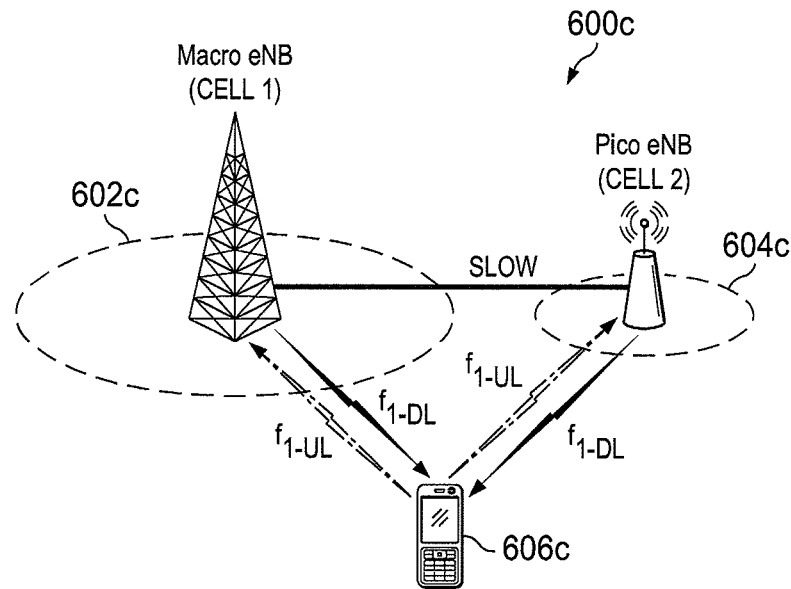

FIG. 6C illustrates an FDD inter-eNB CoMP system 600c. The system 600c includes eNBs 602c and 604c and UE 606c. In some embodiments, the UE 606c is configured to support simultaneous reception of 2 PDSCHs from two serving cells (such as the macro and pico cells) on the same carrier frequency, f1-DL for DL and f1-UL for UL.

Figure 6D:
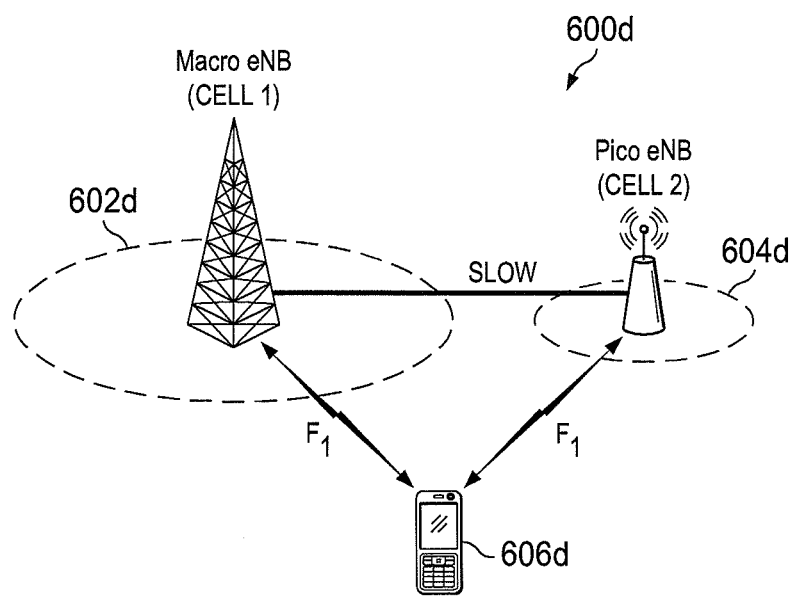

FIG. 6D illustrates a TDD inter-eNB CoMP system 600d. The system 600d includes eNBs 602d and 604d and UE 606d. In some embodiments, the UE 606d is configured with a transmission mode (TM) supporting reception of 2 PDSCHs from two serving cells (such as the macro and pico cells) on the same carrier frequency, F1.

For the operations described in FIGS. 6A through 6D, in some embodiments, the UE may be configured with two serving cells (operating in two carrier frequencies in the cases of FIGS. 6A and 6B or in the same carrier frequency in the cases of FIGS. 6C and 6D) according to 3GPP LTE Rel-10 carrier-aggregation specifications. In the Rel-10 carrier aggregation, the assumption is that two cells are either co-located in a single site or, while not co-located, the backhaul delay is negligible (or the signaling delay between the two cells is significantly less than 1 subframe) so that the two cells in two different sites can operate as if they are in a single site. In such an example, the downlink/uplink scheduling information (such as for PDSCH and PUSCH) of the two cells are dynamically available at each of the two cells.

There are several Rel-10 carrier aggregation operations that rely on the assumption of the dynamically available scheduling information. One such example is PUCCH HARQ-ACK transmissions. In Rel-10, PUCCH can be transmitted only on the primary cell (Pcell) out of the two cells. A PUCCH resource in response to dynamically scheduled PDSCHs is determined by at least one of the dynamically available information, such as a CCE index of a PDCCH scheduling the PDSCH in the Pcell, a state of a TPC field in the PDCCH scheduling the secondary cell's (Scell's) PDSCH, and/or the like. For example, an FDD UE configured with multiple cells and PUCCH format 3 transmits HARQ-ACK transmissions according to the following Rel-10 specification. Section 10.1.2.2.2, titled "PUCCH format 3 HARQ-ACK procedure" in 36.213 REF3, recites:

For FDD with PUCCH format 3, the UE uses PUCCH resource $n_{PUCCH}^{(3,\tilde{p})}$ or $n_{PUCCH}^{(1,\tilde{p})}$ for a transmission of HARQ-ACK in subframe n for $\tilde{p}$ mapped to antenna port p.

For a PDSCH transmission only on the primary cell indicated by the detection of a corresponding PDCCH in subframe n−4 or for a PDCCH indicating downlink SPS release (defined in section 9.2) in subframe n−4 on the primary cell, the UE uses PUCCH format 1a/1b and PUCCH resource $n_{PUCCH}^{(1,\tilde{p})}$ with $n_{PUCCH}^{(1,\tilde{p}0)} = n_{CCE} + N_{PUCCH}^{(1)}$ for antenna port $p_0$, where $n_{CCE}$ is the number of the first CCE (i.e. lowest CCE index used to construct the PDCCH) used for transmission of the corresponding PDCCH and $N_{PUCCH}^{(1)}$ is configured by higher layers. When two antenna port transmission is configured for PUCCH format 1a/1b, the PUCCH resource for antenna port $p_1$ is given by $n_{PUCCH}^{(1,\tilde{p}1)} = n_{CCE} + 1 + N_{PUCCH}^{(1)}$.

For a PDSCH transmission only on the primary cell where there is not a corresponding PDCCH detected in subframe n−4, the UE uses PUCCH format 1a/1b and PUCCH resource $n_{PUCCH}^{(1,\tilde{p})}$ where the value of $n_{PUCCH}^{(1,\tilde{p})}$ is determined according to higher layer configuration and Table 9.2-2. For a UE configured for two antenna port transmission for PUCCH format 1a/1b, a PUCCH resource value in Table 9.2-2 maps to two PUCCH resources with the first PUCCH resource $n_{PUCCH}^{(1,\tilde{p}0)}$ for antenna port $P_0$ and the second PUCCH resource $n_{PUCCH}^{(1,\tilde{p}1)}$ for antenna port $p_1$. Otherwise, the PUCCH resource value maps to a single PUCCH resource $n_{PUCCH}^{(1,\tilde{p}0)}$ for antenna port $p_0$.

For a PDSCH transmission on the secondary cell indicated by the detection of a corresponding PDCCH in subframe n−4, the UE uses PUCCH format 3 and PUCCH resource $n_{PUCCH}^{(3,\tilde{p})}$ where the value of $n_{PUCCH}^{(3,\tilde{p})}$ is determined according to higher layer configuration and Table 10.1.2.2.2-1. The TPC field in the DCI format of the corresponding PDCCH can be used to determine the PUCCH resource values from one of the four resource values configured by higher layers, with the mapping defined in Table 10.1.2.2.2-1. For a UE configured for two antenna port transmission for PUCCH format 3, a PUCCH resource value in Table 10.1.2.2.2-1 maps to two PUCCH resources with the first PUCCH resource $n_{PUCCH}^{(3,\tilde{p}0)}$ for antenna port $p_0$ and the second PUCCH resource $n_{PUCCH}^{(3,\tilde{p}1)}$ for antenna port $p_1$. Otherwise, the PUCCH resource value maps to a single PUCCH resource $n_{PUCCH}^{(3,\tilde{p}0)}$ for antenna port $p_0$. A UE assumes that the same HARQ-ACK PUCCH resource value is transmitted in each DCI format of the corresponding secondary cell PDCCH assignments in a given subframe.

Table 10.1.2.2.2-1 of 36.213 REF3, titled "PUCCH Resource Value for HARQ-ACK Resource for PUCCH" is shown below.

| Value of 'TPC command for PUCCH' | $n_{PUCCH}^{(3,\tilde{p})}$ |
|---|---|
| '00' | The 1st PUCCH resource value configured by the higher layers |
| '01' | The 2nd PUCCH resource value configured by the higher layers |
| '10' | The 3rd PUCCH resource value configured by the higher layers |
| '11' | The 4th PUCCH resource value configured by the higher layers |

In some embodiments, a UE in FIGS. 6A and 6C may be configured with two serving cells, such as cell 1 (Pcell) 602a, 602c and cell 2 (Scell) 604a, 604c with PUCCH format 3. The UE receives at least one PDSCH in subframe n. To schedule the Pcell PDSCH, the Pcell transmits a PDCCH/ePDCCH to the UE whose leading CCE number is nCCE. To schedule the Scell PDSCH, the Scell transmits a PDCCH/ePDCCH to the UE whose state of the TPC field is x='01'. Then, the UE transmits HARQ-ACK differently in subframe n+4 depending on the examples as in the following, according to the Rel-10 specification.

TABLE 1 is an illustration of PUCCH HARQ-ACK transmissions according to the legacy method.

TABLE 1

| | Pcell PDSCH in subframe n | Scell PDSCH in subframe n | PUCCH HARQ-ACK in subframe n + 4 |
|---|---|---|---|
| Example 1 | Yes | No | PUCCH format 1a/1b, $n_{PUCCH}^{(1,\tilde{p}0)} = n_{CCE} + N_{PUCCH}^{(1)}$ |
| Example 2 | No | Yes | PUCCH format 3, the 2nd PUCCH resource value. |
| Example 3 | Yes | Yes | PUCCH format 3, the 2nd PUCCH resource value. |

This disclosure recognizes the issues associated with these examples, when the Rel-10 specification is used for the UE's HARQ-ACK transmissions in FIGS. 6A through 6D. As shown in TABLE 1, three examples are identified. In example 1, there may be no issue of a Pcell receiving HARQ-ACK intended to the Pcell because the Pcell knows the PUCCH resource format and the index nCCE. In example 2, there may be no issue of an Scell receiving HARQ-ACK intended to the Scell as long as the Scell knows the PUCCH format 3 resource assignment. In example 3, the Pcell may not be able to identify the HARQ-ACK resource because the Pcell does not know which TPC value has been used by the Scell to select the PUCCH format 3 resource. On the other hand, the Scell can identify the PUCCH format 3 resource intended to the Scell.

Furthermore, when a UE in FIGS. 6A through 6D is considered, the TPC value in the Scell DL assignment PDCCH may not be redundant information because the Pcell and Scell are not co-located and a UE may transmit different PUCCHs to different reception points. It is noted that in Rel-10 carrier aggregation, the TPC value in the Scell DL assignment PDCCH was not used to indicate a PUCCH power control command because the TPC value in the Pcell DL assignment PDCCH can already control the PUCCH power. Hence, the TPC value in the Scell DL assignment PDCCH was used for indicating other information, such as the PUCCH format 3 resource.

In some embodiments, a deployment/configuration is used where the macro cell is the Pcell and the pico cell is an Scell to avoid too frequent hand-overs between pico cells and to facilitate only macro-to-macro handovers. As discussed above, 3GPP LTE PHY specifications (such as 36.211, 36.212 and 36.213) adopted the terminology of Pcell and Scell from the MAC/RRC specifications (such as 36.331) and used them to define PHY control signaling behavior (such as in TABLE 1). While the mapping of a macro cell to a Pcell seems to be still valid even in the example of inter-eNB CA and CoMP for mobility purposes, the mapping of a macro cell to a Pcell for the PHY control signaling may not be good. In particular, there are many benefits to separate carriers for MAC/RRC control signaling and PHY control signaling in case of inter-eNB CA. For example, energy efficiency and more spatial reuse can be achieved when more frequent signaling (i.e., PHY control signaling) is targeted to the nearby pico cell rather than the far-away macro cell. Having this observation, it may be desired to break ties between the MAC/RRC layer Pcell and the PHY layer Pcell.

In this disclosure, the definitions of Pcell and Scell are identical to the ones given in the Background section. When needed, PHY layer Pcell is separately defined against the legacy Pcell, which is coupled with the MAC/RRC layer Pcell.

One or more embodiments recognize issues of the legacy methods associated with PUCCH format 3 in FDD to apply for the UE. When the legacy method (PUCCH format 3, Rel-10) is used for the HARQ-ACK transmission of a UE in FIG. 3, the following issues are identified.

One or more embodiments recognize that when both Pcell and Scell have transmitted PDSCHs in subframe n, the Pcell cannot find PUCCH format 3 HARQ-ACK resource for receiving the HARQ-ACK intended to itself because the Pcell does not know what TPC value set the Scell set for the Scell PDCCH.

One or more embodiments recognize that when considering multiple reception points for PUCCH transmissions, the Scell TPC command in the Scell DL assignment may not be redundant information, and hence it may not be proper to be used for PUCCH format 3 resource indication.

One or more embodiments recognize that it may be beneficial to break ties between MAC/RRC layer Pcell and the PHY layer Pcell.

In regards to breaking the ties from MAC/RRC layer Pcell, various embodiments propose to separately configure the PHY layer Pcell to handle UL control signaling related operations, apart from the legacy Pcell. In this example, the PHY layer Pcell may not necessarily be the same the legacy Pcell. For a UE, the PHY layer Pcell is selected among the configured/activated cells.

When the PHY layer Pcell is configured, the PUCCH is transmitted on the PHY layer Pcell, and the HARQ-ACK operations for CA described in REF3 are now dependent upon the PHY layer Pcell instead of the legacy Pcell. In the following description of Method 1, the Pcell may imply PHY layer Pcell in this context.

Alternatively, the legacy Pcell in this example handles control signaling other than the UL control signaling, such as the PHY layer common downlink control signaling (PDCCH in the common search space), mobility related procedures and RRC configurations.

In an example embodiment, referred to as Method 1, a HARQ-ACK transmission of an FDD UE is configured with PUCCH format 3. In order to resolve the issues identified above, Method 1 considers that a UE configured with multiple (such as 2) serving cells located in different sites as in FIG. 6A or 6C and also configured with PUCCH format 3 transmits HARQ-ACK according to TABLE 2. TABLE 2 shows PUCCH HARQ-ACK transmissions according to Method 1.

TABLE 2

| | Pcell PDSCH in subframe n | Scell PDSCH in subframe n | PUCCH HARQ-ACK in subframe n + 4 |
|---|---|---|---|
| Example 1 | Yes | No | PUCCH format 1a/1b, $n_{PUCCH}^{(1,\tilde{p}0)} = n_{CCE} + N_{PUCCH}^{(1)}$ |
| Example 2 | No | Yes | PUCCH format 3, RRC configured. |
| Example 3 | Yes | Yes | PUCCH format 3, RRC configured. |

Although Method 1 will be described as using the "Pcell" and "Scell" terminology, the same functionality is generally applicable when the Pcell is replaced with "first serving cell" and the Scell is replaced with "second serving cell" or when Pcell and Scell are swapped. Also, in case of inter-eNB CoMP as shown in FIGS. 6C and 6D, the Pcell and Scell in TABLE 2 may be replaced with first TP and second TP, respectively.

In TABLE 2, a single PUCCH format 3 resource $n_{PUCCH}^{(3,\tilde{p})}$ (or a pair of PUCCH format 3 resources in case PUCCH format 3 transmission is configured from two antenna ports) is RRC configured for Examples 2 and 3 that consider PUSCH transmission from the Scell in subframe n. The PUCCH format 3 resource(s) can be informed to the Pcell, and hence the Pcell can receive HARQ-ACK information intended to itself (Example 3). The RRC configuration for the PUCCH format 3 transmission parameters may also be conveyed by the Scell, instead of the Pcell, in case the Scell has its own RRC.

In some embodiments, there may be a HARQ-ACK bit sequence generation for PUCCH format 3. In a first alternative, the HARQ-ACK bit sequence is generated according to Rel-10 carrier aggregation specification, 3GPP TS 36.212 v10.5.0. In the below description, a cell with cell index 0 corresponds to the Pcell, while a cell with non-zero cell index corresponds to an Scell.

The HARQ-ACK bits are received from higher layers for each subframe of each cell. Each positive acknowledgement (ACK) is encoded as a binary '1' and each negative acknowledgement (NACK) is encoded as a binary '0'. For the example where PUCCH format 3 is configured by higher layers and is used for transmission of the HARQ-ACK feedback information, the HARQ-ACK feedback consists of the concatenation of HARQ-ACK bits for each of the serving cells. For cells configured with transmission modes 1, 2, 5, 6 or 7, i.e., single codeword transmission modes, one bit of HARQ-ACK information, $a_k$, is used for that cell. For cells configured with other transmission modes, two bits of HARQ-ACK information are used for those cells, i.e., $a_k$, $a_{k+1}$ with $a_k$ corresponding to HARQ-ACK bit for codeword 0 and $a_{k+1}$ corresponding to that for codeword 1.

In some embodiments, $N_{A/N}^{PUCCH\,format}3$ is defined as the number of HARQ-ACK bits including the possible concurrent transmission of scheduling requests when PUCCH format 3 is used for transmission of HARQ-ACK feedback.

For FDD, the sequence of bits $a_0, a_1, a_2, \ldots, a_{N_{A/N}^{PUCCH\,format\,3}-1}$ is the result of the concatenation of HARQ-ACK bits for different cells according to the following pseudo-code:

```
Set c = 0 - cell index: lower indices correspond to lower RRC indices of
corresponding cell
    Set j = 0 - HARQ-ACK bit index
    Set N_cells^DL to the number of cells configured by higher layers for the
    UE
    while c < N_cells^DL
        if transmission mode configured in cell c ∈ {1,2,5,6,7} -- 1 bit
        HARQ-ACK
feedback for this cell
            a_j = HARQ-ACK bit of this cell
            j = j + 1
        else
            a_j = HARQ-ACK bit corresponding to the first codeword
            of this cell
            j = j + 1
            a_j = HARQ-ACK bit corresponding to the second codeword
            of this
cell
            j = j + 1
        end if
        c = c + 1
    end while
```

The two cells may need to exchange messages, such as in the X2 interface, in order to align their understanding on the construction and location of PUCCH format 3.

From Pcell to Scell, the message conveys UE-specific information, such as number of transport blocks in the Pcell TM, or Pcell TM, or number of HARQ-ACK bits reserved for Pcell. The message can also convey information about periodic CSI transmission parameters to the Pcell and of SR reporting subframes to the Pcell. This information allows the Scell to know how the UE constructs a UCI bit sequence for PUCCH format 3 (such as according to HARQ-ACK bit sequence generation for PUCCH format 3 and also considering periodic CSI or SR multiplexing when applicable). In other words, the Scell knows where, in a PUCCH format 3 payload, the UE transmits UCI information for the Scell.

From Scell to Pcell, the message conveys UE-specific information for PUCCH format 3 transmissions, such as a respective scrambling sequence or a resource index $n_{PUCCH}^{(3,p)}$ configured by the Scell so that the Pcell can receive a PUCCH format 3 transmission from the UE.

In a second alternative, the HARQ-ACK bit sequence is generated in such a way that the HARQ-ACK bit concatenation is done in the descending order of the cell index c. In this example the pseudo code can be expressed as follows. For FDD, the sequence of bits $$a_0, a_1, a_2, \ldots, a_{N_{A/N}^{PUCCH\ format3}-1}$$

is the result of the concatenation of HARQ-ACK bits for different cells according to the following pseudo-code:

```
Set c = N_cells^DL - cell index: lower indices correspond to lower RRC
    indices of
corresponding cell
Set j = 0 - HARQ-ACK bit index
Set N_cells^DL to the number of cells configured by higher layers for the
    UE
while c > 0
    if transmission mode configured in cell c ∈ {1,2,5,6,7} -- 1 bit
        HARQ-ACK
feedback for this cell
        a_j = HARQ-ACK bit of this cell
        j = j + 1
    else
        a_j = HARQ-ACK bit corresponding to the first codeword of
            this cell
        j = j + 1
        a_j = HARQ-ACK bit corresponding to the second codeword
            of this
cell
        j = j + 1
    end if
    c = c - 1
end while
```

For the second alternative, the Scell can obtain HARQ-ACK bits intended to itself from the beginning of the HARQ-ACK bit sequence conveyed in the PUCCH format 3, and the Scell does not need to receive any X2 message from the Pcell to determine the starting position of the Scell HARQ bits. The same can apply for the other UCI types (P-CSI and SR). Hence, one-way message transfer could be sufficient in the X2 interface in order to align the understanding of the two cells on the payload, construction, and location of PUCCH format 3.

From Scell to Pcell, the message conveys UE-specific information on the PUCCH format 3 resource index $n_{PUCCH}^{(3,p)}$ configured by the Scell, and number of transport blocks in the Scell TM, or Scell TM, or number of HARQ-ACK bits reserved for the Scell. The message can also convey information about periodic CSI transmission parameters in the Scell and of SR reporting subframes in the Scell. In this example, the Pcell knows how to receive UCI intended for itself.

There are several alternatives for allocating the PUCCH format 1a/1b resource and the PUCCH format 3 resource in TABLE 2 to different UL cells. A UE is assumed to be configured with two pairs of a DL cell and a UL cell, DL/UL Pcell and DL/UL Scell, respectively. In a first alternative, both PUCCH formats are mapped on the UL Pcell. In a second alternative, PUCCH format 1a/1b resource is mapped on the UL Pcell, while the PUCCH format 3 is mapped on the UL Scell. In this second example, UL control signaling for PDSCH in a DL serving cell goes to the corresponding UL serving cell. In a third alternative, both PUCCH formats are mapped on the UL Scell. In a fourth alternative, PHY UL Pcell is RRC configurable, and all PUCCH transmissions are mapped onto the configured UL Pcell.

For uplink frequency reuse (or area splitting), a UE specific configuration of PUCCH virtual cell ID(s) (VCID) can be considered for the application of TABLE 2. When a PUCCH VCID is configured for a PUCCH, the PUCCH VCID is used to replace a physical cell ID ($N_{ID}^{cell}$) in the uplink base sequence generation and hopping for the PUCCH.

In one method, two separate PUCCH virtual cell IDs ($n_{ID}^{PUCCH}$) are RRC configured for the two respective PUCCH formats (PUCCH format 1a/1b and PUCCH format 3) in TABLE 2.

In another method, for the PUCCH associated with the Pcell (i.e., PUCCH format 1a/1b), a physical cell ID ($N_{ID}^{cell}$) is used for the base sequence generation and hopping. For the PUCCH associated with Scell (i.e., PUCCH format 3), an RRC configured virtual cell ID ($n_{ID}^{PUCCH}$) is used.

In another method, for PUCCH format 1a/1b, a physical cell ID ($N_{ID}^{cell}$) is used for base sequence generation and hopping. For PUCCH format 3, an RRC configured virtual cell ID ($n_{ID}^{PUCCH}$) is used.

In the above methods, for each PUCCH VCID, a corresponding PUCCH format 1a/1b resource offset, $N_{PUCCH}^{(1)}$, can be configured.

Both cells could be able to receive PUCCH format 3 while PUCCH format 1a/1b is targeted only to the Pcell. This implies that the Pcell needs to be able to reliably receive PUCCH format 1a/1b and PUCCH format 3 while the Scell needs to be able to reliably receive PUCCH format 3. If power reduction is desired for transmitting PUCCH format 1a/1b, the network may configure a closer cell as the Pcell and a farther-away cell as the Scell, in which example the UE can transmit PUCCH format 1a/1b in a power-efficient way. Furthermore, as PUCCH format 3 has to be received in both the Pcell and the Scell, it could be power controlled such that it can be received at the farther-away cell.

Hence, it is proposed that the correspondence of cell 1 (macro)/cell 2 (pico) in FIGS. 6A through 6D to Scell/Pcell could be flexibly chosen by the network (or the eNB). In one configuration, cell 1 corresponds to the Scell and cell 2 corresponds to the Pcell; in another configuration, the reverse applies as illustrated in FIGS. 7A and 7B.

Figure 7A:
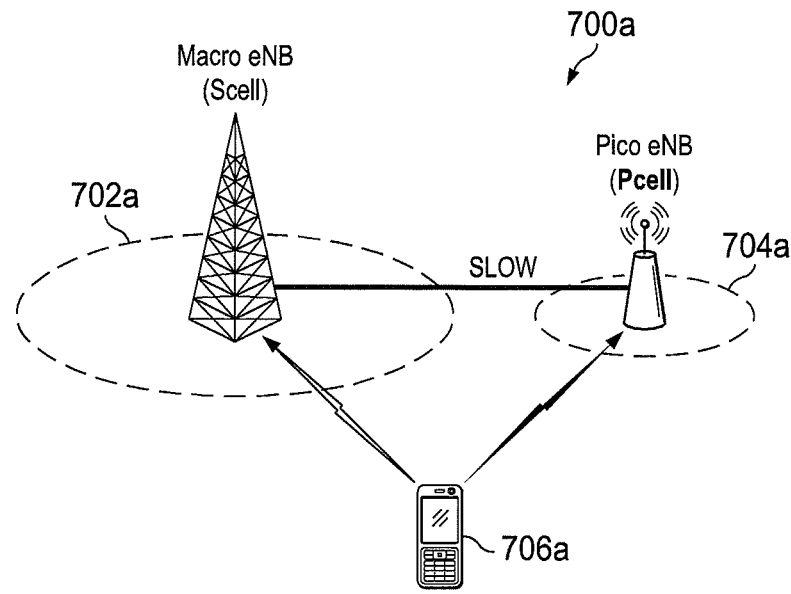
FIGS. 7A and 7B illustrate example systems with an Scell and a Pcell according to this disclosure.
Figure 7B:
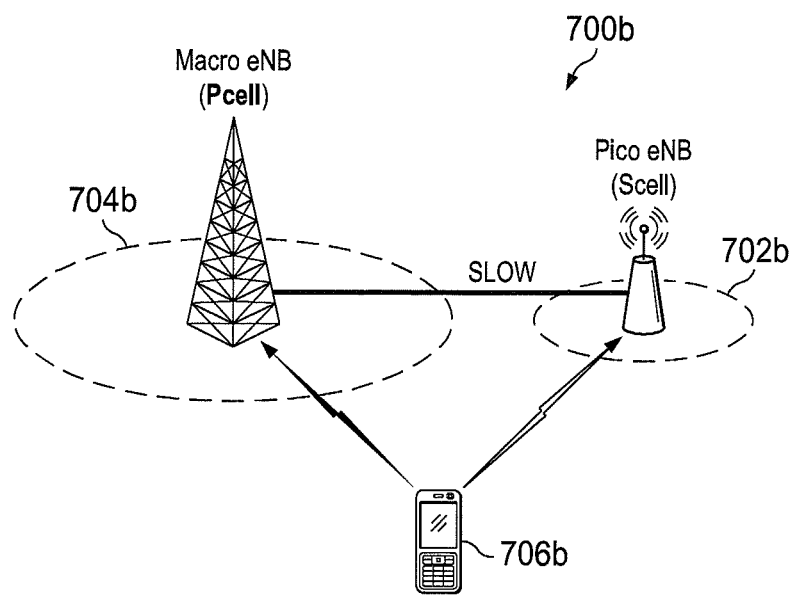

FIGS. 7A and 7B illustrate example systems 700a-700b with an Scell 702a-702b and a Pcell 704a-704b according to this disclosure. Each Pcell 704a-704b has to monitor two PUCCH resources to obtain the HARQ-ACK intended to itself, one for PUCCH format 1a/1b and the other for PUCCH format 3. Pcell 704a-704b does not know whether Scell 702a-702b has transmitted a PDSCH (Example 3) or not (Example 1). In order to obtain its HARQ-ACK, Pcell 704a-704b may have to do energy detection to determine which format (between PUCCH format 1a/1b and PUCCH format 3) has been transmitted by a UE 706a-706b. When the PUCCH format 3 resource is exclusively assigned to UE 706a-706b, the reliability of this energy detection is equivalent to the conventional example of Rel-10 carrier aggregation.

Conversely, when Scell 702a-702b assigns the PUCCH format 3 resource to more than one UE so that different UEs use the resource in different subframes, the reliability of this energy detection becomes worse. For example, if a first UE and a second UE are configured with a same PUCCH format 3 resource by the Scell and in subframe n only the Pcell transmits PDSCH to the first UE as in Example 1 and only the Scell transmits PDSCH to the second UE as in Example 2, then in subframe n+4 the Pcell tries to blindly detect energy in the PUCCH format 1a/1b resource and in the PUCCH format 3 for the first UE. Since the same PUCCH format 3 resource is used by the second UE, the SINR for detecting the PUCCH format 3 from the first UE decreases, and this may increase a respective false detection probability. However, this false detection event is associated only with Example 1 and, as long as the energy detection of PUCCH format 1a/1b for the first UE is sufficiently reliable, it may not be a significant problem in practice.

Figure 8A:
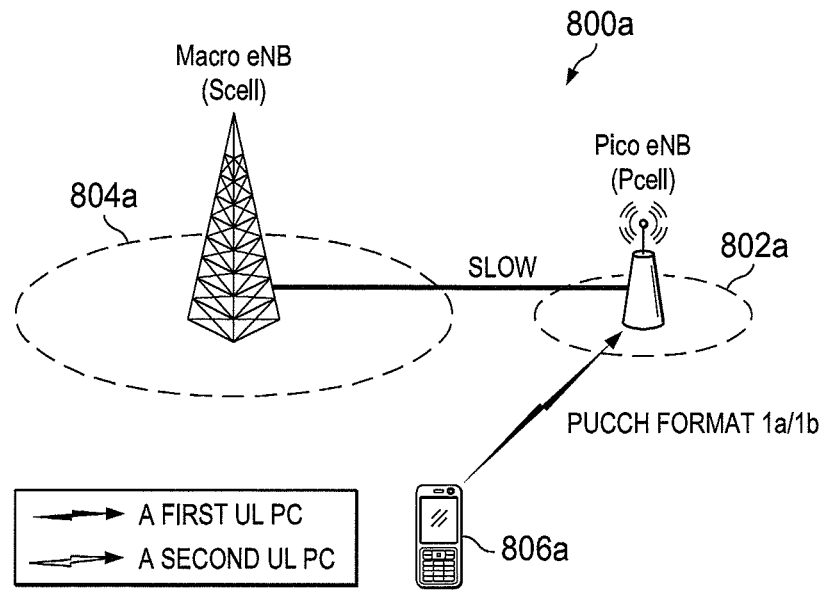
FIGS. 8A through 8C illustrate example systems with a macro eNB as an Scell and a pico eNB as a Pcell according to this disclosure.
Figure 8B:
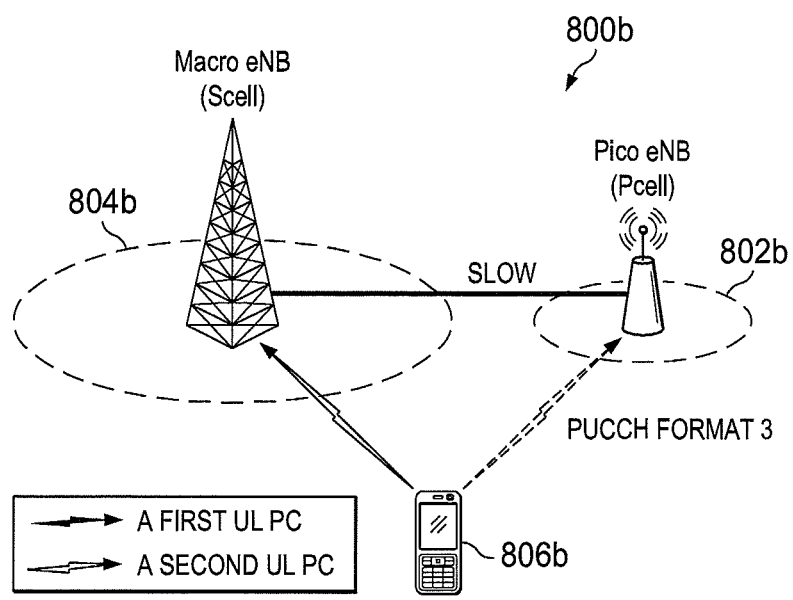
Figure 8C:
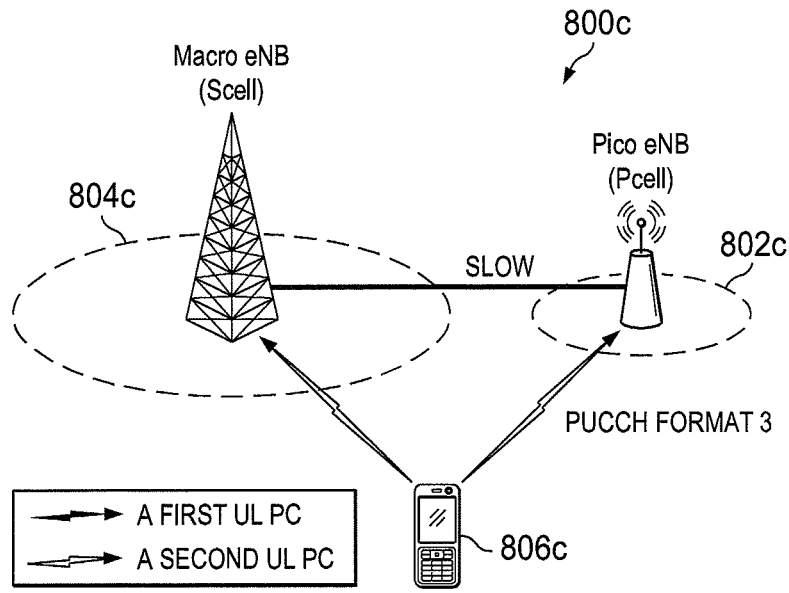

FIGS. 8A through 8C illustrate example systems 800a-800c with a macro eNB as an Scell 804a-804c and a pico eNB as a Pcell 802a-802c according to this disclosure. In one example embodiment, Pcell 802a-802c is a pico cell, and Scell 804a-804c is a macro cell. The commonality for HARQ-ACK transmission may be maintained between the proposed method and the method in TABLE 1 in the sense that PUCCH format 1a/1b is used when a UE 806a-806c receives only the Pcell PDCCH and PUCCH format 3 is used when UE 806a-806c receives an Scell PDCCH scheduling a PDSCH. However, in this example, UE 806a-806c may experience frequent handovers as Pcell 802a-802c is a pico cell.

In order to facilitate reception of PUCCHs in two different sites (cells), Example 1 considers that UE 806a-806c applies the power control mechanism according to TABLE 3. TABLE 3 shows PUCCH HARQ-ACK power control according to Example 1.

TABLE 3

| | Pcell PDSCH in subframe n | Scell PDSCH in subframe n | Power control for PUCCH in subframe n + 4 |
|---|---|---|---|
| Example 1 | Yes | No | A first power control loop (for PUCCH format 1a/1b). |
| Example 2 | No | Yes | A second power control loop (for PUCCH format 3). |
| Example 3 | Yes | Yes | A second power control loop (for PUCCH format 3). |

In this embodiment, the TPC command transmitted in the Scell PDCCH (DL assignment) scheduling the Scell PDSCH is used for closed-loop power control for the PUCCH format 3 transmissions while the TPC command transmitted in the Pcell PDCCH (DL assignment) scheduling the Pcell PDSCH is used for closed-loop power control for the PUCCH format 1a/1b transmissions.

The first power control is intended to facilitate fair reception of the PUCCH format 1a/1b at the Pcell, while the second power control is intended to facilitate fair reception of the PUCCH format 3 at the Scell as shown in TABLE 4. TABLE 4 shows PUCCH HARQ-ACK power control loops.

TABLE 4

| | Path-loss reference | TPC command to use | Other open-loop power control parameters (e.g., P0 and alpha as in REF3) |
|---|---|---|---|
| A first power control loop | RSRP measured relying on RS transmitted in the Pcell | TPC transmitted in the DL assignment PDCCH in the Pcell scheduling a PDSCH in the Pcell | A first set of OL PC parameters |
| A second power control loop | RSRP measured relying on RS transmitted in the Scell | TPC transmitted in the DL assignment PDCCH in the Scell scheduling a PDSCH in the Scell | A second set of OL PC parameters |

In TABLE 4, the RS can be at least one of CRS, CSI-RS and a discovery signal.

Figure 9A:
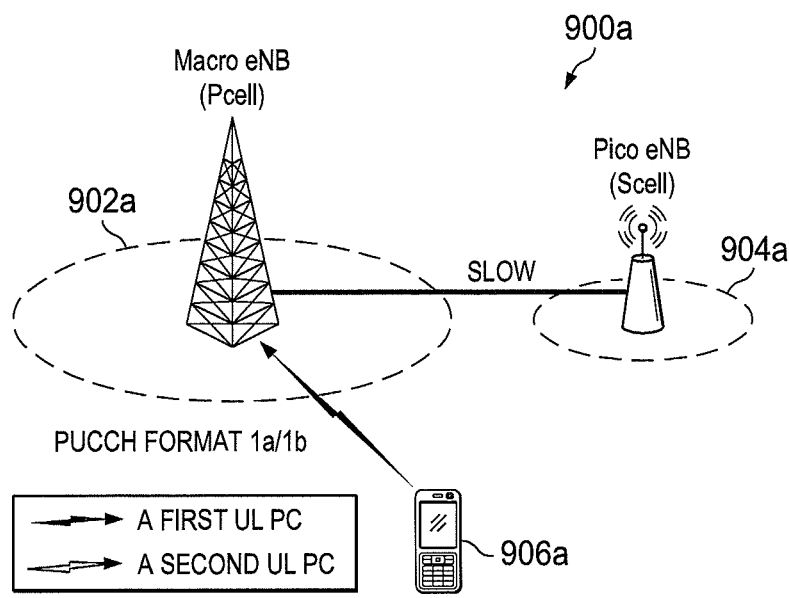
FIGS. 9A through 9C illustrate example systems with a macro eNB as a Pcell and a pico eNB as an Scell according to this disclosure.
Figure 9B:
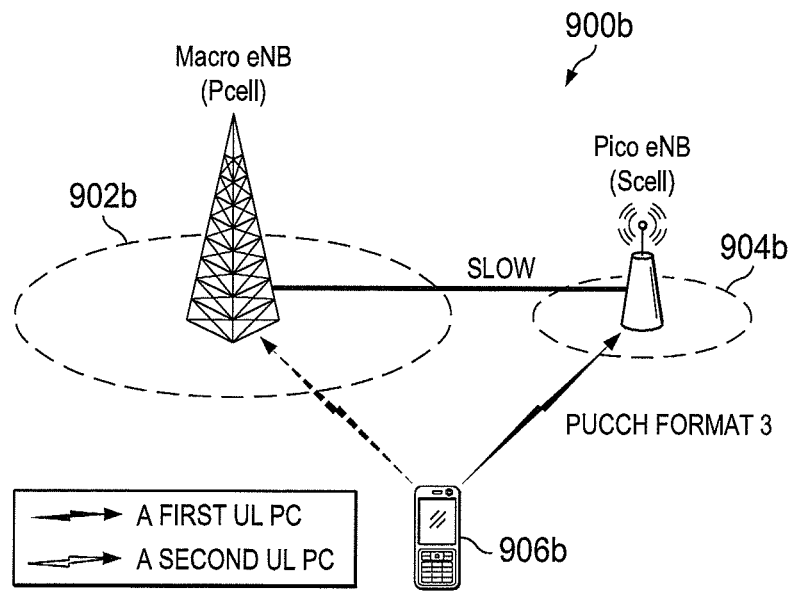
Figure 9C:
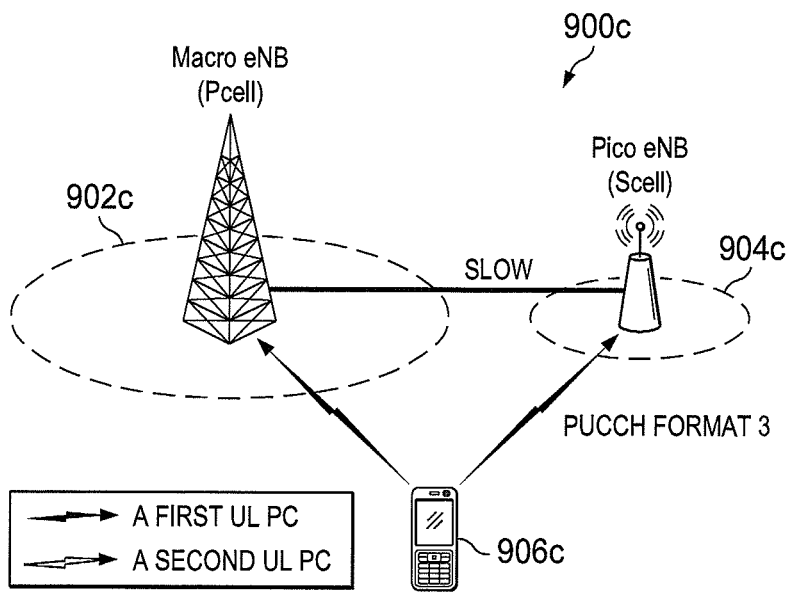

FIGS. 9A through 9C illustrate example systems 900a-900c with a macro eNB as a Pcell 902a-902c and a pico eNB as an Scell 904a-904c according to this disclosure. In some embodiments, Pcell 902a-902c is a macro cell, and Scell 904a-904c is a pico cell. The Pcell 902a-902c handles the mobility, and the Scell 904a-904c handles data transmission/reception and PHY control signaling. However, when a UE 906a-906c transmits/receives signals from/to the pico cell more frequently than the macro cell, the less efficient PUCCH format 3 resource is heavily used, which may incur substantial UL overhead.

In order to facilitate reception of PUCCHs in two different sites (cells), this embodiment considers that the UE applies the power control mechanism according to TABLE 5. TABLE 5 shows PUCCH HARQ-ACK power control according to this embodiment.

TABLE 5

| | Pcell PDSCH in subframe n | Scell PDSCH in subframe n | Power control for PUCCH in subframe n + 4 |
|---|---|---|---|
| Example 1 | Yes | No | The first power control loop (for Pcell). |
| Example 2 | No | Yes | The first power control loop (for Pcell). |
| Example 3 | Yes | Yes | The first power control loop (for Pcell). |

In this example, the TPC command transmitted in the Scell PDCCH (DL assignment) scheduling the Scell PDSCH is used for closed-loop power control in Example 2. On the other hand, the TPC command transmitted in the Pcell PDCCH (DL assignment) scheduling the Pcell PDSCH is used for closed-loop power control for Example 1 and Example 3.

The first power control is intended to facilitate fair reception of the HARQ-ACK at the Pcell, while the second power control is intended to facilitate fair reception of the HARQ-ACK at the Scell as shown in TABLE 4.

In another example embodiment, denoted Method 2, a HARQ-ACK transmission of an FDD UE is configured with PUCCH format 3. In order to resolve the issues identified above, the various embodiments propose that a UE is configured with multiple (such as 2) serving cells located in the different sites as in FIGS. 6A and 6C and also configured with PUCCH format 3 could transmit HARQ-ACK according to TABLE 6. TABLE 6 is different from TABLE 2 in that it handles Example 2 differently, i.e., PUCCH format 1a/1b is used in Example 2 instead of PUCCH format 3. TABLE 6 shows PUCCH HARQ-ACK transmissions according to Method 2.

TABLE 6

| | Pcell's PDSCH in subframe n | Scell's PDSCH in subframe n | PUCCH HARQ-ACK in subframe n + 4 |
|---|---|---|---|
| Example 1 | Yes | No | PUCCH format 1a/1b, $n_{PUCCH,1}^{(1,\tilde{p}_0)} = n_{CCE,1} + N_{PUCCH}^{(1)}$ |
| Example 2 | No | Yes | PUCCH format 1a/1b, $n_{PUCCH,2}^{(1,\tilde{p}_0)} = n_{CCE,2} + N_{PUCCH}^{(1)}$ |
| Example 3 | Yes | Yes | PUCCH format 3, RRC configured. |

Although Method 2 will be described using the "Pcell and Scell" terminology, the same functionality is generally applicable when Pcell is replaced with "first serving cell" and Scell is replaced with "second serving cell" or when Pcell and Scell are swapped. In case of inter-eNB CoMP in FIGS. 6C and 6D, the Pcell and the Scell in TABLE 6 may be replaced with a first TP and a second TP, respectively.

In TABLE 6, PUCCH format 1a/1b associated with Example 1 is coupled with a PDCCH transmitted in the Pcell and scheduling a PDSCH transmission in the Pcell. The PUCCH format 1a/1b resource is determined by $n_{PUCCH,1}^{(1,\tilde{p}_0)} = n_{CCE,1} + N_{PUCCH,1}^{(1)}$, where $n_{CCE,1}$ is the smallest CCE index used to transmit the PDCCH.

In TABLE 6, PUCCH format 1a/1b associated with Example 2 is coupled with a PDCCH transmitted in the Scell and scheduling a PDSCH transmission in the Scell. The PUCCH format 1a/1b resource is determined by $n_{PUCCH,2}^{(1,\tilde{p}_0)} = n_{CCE,2} + N_{PUCCH,2}^{(1)}$, where $n_{CCE,2}$ is the smallest CCE index used to transmit the PDCCH.

In TABLE 6, a single PUCCH format 3 resource $n_{PUCCH}^{(3,\tilde{p})}$ (or a pair of PUCCH format 3 resources in case PUCCH format 3 transmission is configured to be from two antenna ports) is RRC configured for Example 3 where the UE receives PDSCHs from both cells in subframe n. In case the PUCCH format 3 resource is determined by one of the two cells and is informed to the other cell, the other cell uses the resource for receiving PUCCH format 3 and can access the HARQ-ACK information intended to itself. It is noted that the RRC configuration for the PUCCH format 3 may be conveyed by a PDSCH transmission in the Scell in case the Scell has its own RRC.

In some embodiments, the HARQ-ACK bit sequence (and, in general, UCI bit sequence) for PUCCH format 3 can be generated in the same way as in Method 1.

There are several alternatives for allocating the PUCCH format 1a/1b resource and the PUCCH format 3 resource in TABLE 6 to different UL cells. A UE is assumed to be configured with two pairs of a DL cell and a UL cell, DL/UL Pcell and DL/UL Scell, respectively.

In a first alternative, all PUCCH formats are transmitted on the UL Pcell. In a second alternative, PUCCH format 1a/1b resource associated with Example 1 is mapped on the UL Pcell, while the PUCCH format 3 and PUCCH format 1a/1b resources associated with Example 2 are mapped on the UL Scell. In this example, UL control signaling for PDSCH in a DL serving cell goes to the corresponding UL serving cell. In a third alternative, all PUCCH formats are mapped on UL Scell. In a fourth alternative, PHY UL Pcell is RRC configurable, and all PUCCHs are mapped onto the configured UL Pcell.

For uplink frequency reuse (or area splitting), a UE specific configuration of PUCCH virtual cell ID(s) (VCID) can be considered for the application of Table 6. When a PUCCH VCID is configured for a PUCCH, the PUCCH VCID is used to replace a physical cell ID ($N_{ID}^{cell}$) in uplink base sequence generation and hopping for the PUCCH.

In one embodiment, three separate PUCCH virtual cell IDs ($n_{ID}^{PUCCH}$) are respectively RRC configured for the three PUCCH formats (two for PUCCH format 1a/1b in Examples 1 and 2 and one for PUCCH format 3).

In another embodiment, for the PUCCH associated with the Pcell (i.e., PUCCH format 1a/1b in Example 1), a physical cell ID ($N_{ID}^{cell}$) is used for base sequence generation and hopping. For the PUCCHs associated with Scell (i.e., PUCCH format 1a/1b in Example 2 and PUCCH format 3), an RRC configured virtual cell ID ($n_{ID}^{PUCCH}$) is used.

In another embodiment, for PUCCH format 1a/1b, a physical cell ID ($N_{ID}^{cell}$) is used for base sequence generation and hopping. For the PUCCH format 3, an RRC configured virtual cell ID ($n_{ID}^{PUCCH}$) is used.

In these methods, for each PUCCH VCID, a corresponding PUCCH format 1a/1b resource offset, $N_{PUCCH}^{(1)}$, can be configured.

It is also noted that PUCCH format 3 could be received at both cells in Example 3, while PUCCH format 1a/1b is targeted only to the Pcell or only to the Scell. This implies that both the Pcell and the Scell need to be able to reliably receive a respective PUCCH format 1a/1b and also reliably receive PUCCH format 3. Therefore, PUCCH format 3 could be power controlled so that it can be received at the one of the two cells that requires the larger transmission power and that cell can be either the Pcell or the Scell depending on the configuration.

Figure 10A:
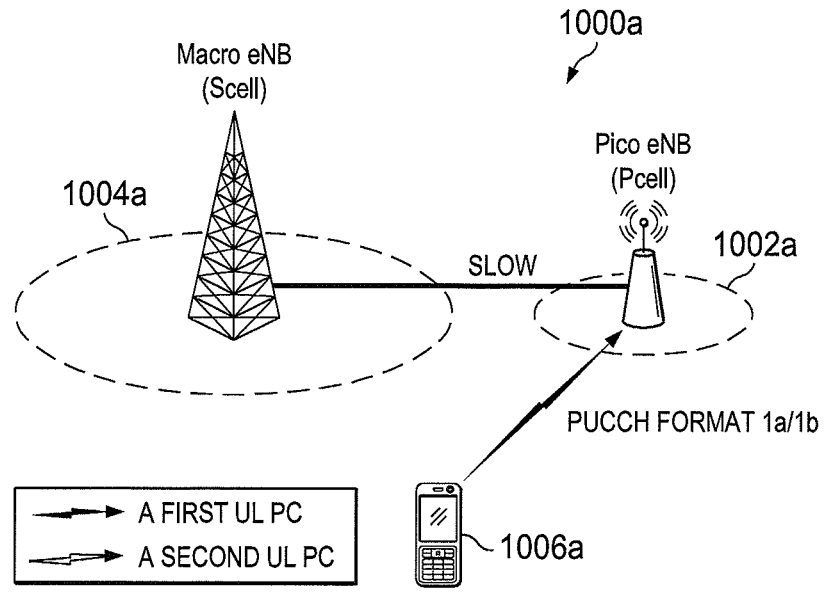
FIGS. 10A through 10C illustrate example systems with a macro eNB as an Scell and a pico eNB as a Pcell according to this disclosure.
Figure 10B:
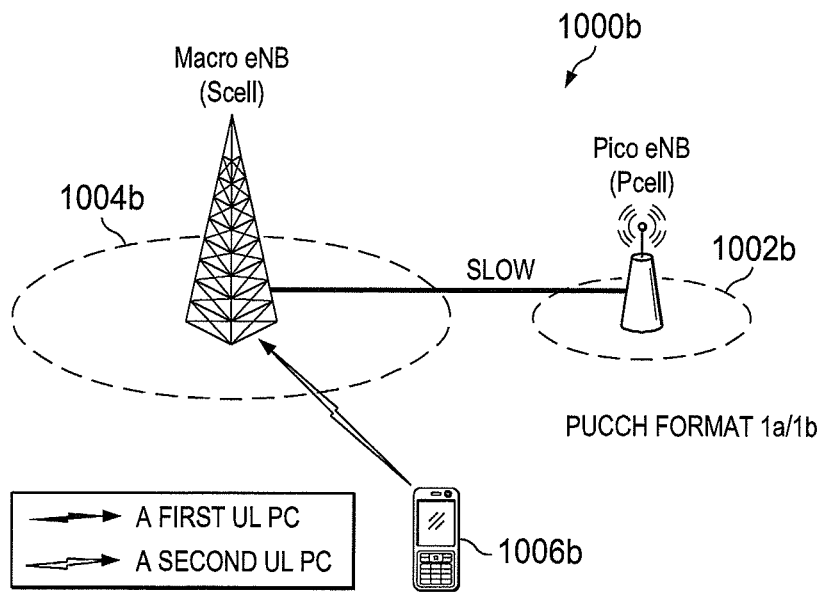
Figure 10C:
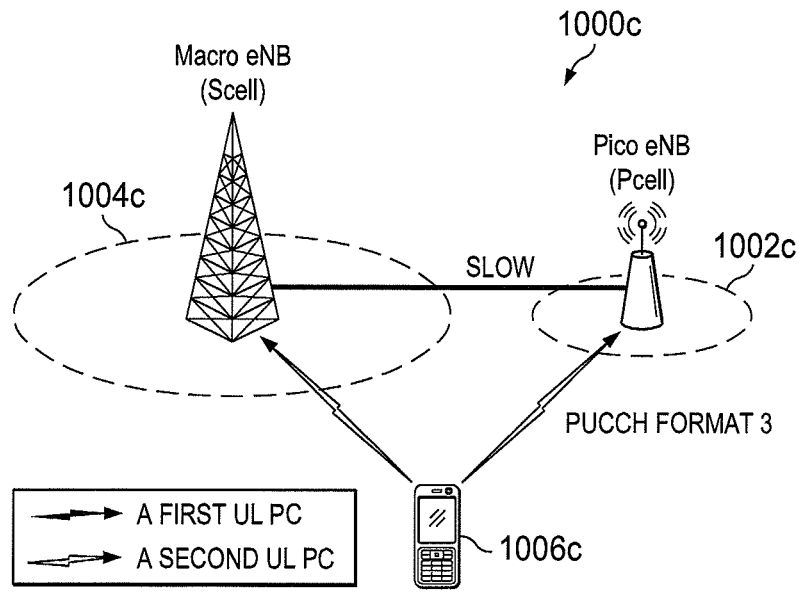

FIGS. 10A through 10C illustrate example systems 1000a-1000c with a macro eNB as an Scell 1004a-1004c and a pico eNB as a Pcell 1002a-1002c according to this disclosure. In some embodiments, Pcell 1002a-1002c is a pico cell, and Scell 1004a-1004c is a macro cell. This embodiment maintains the commonality for HARQ-ACK transmissions between Method 2 and the method in TABLE 1 as PUCCH format 1a/1b is used when a UE 1006a-1006c receives only the Pcell's PDCCH (scheduling a PDSCH or SPS release) and PUCCH format 3 is used when the UE 1006a-1006c receives the Scell's PDCCH (scheduling a PDSCH). However, in this example, UE 1006a-1006c may experience frequent handovers as the Pcell is a pico cell.

In order to facilitate reception of PUCCHs in two different sites (cells), this embodiment considers that a UE applies a power control mechanism according to TABLE 7. TABLE 7 shows PUCCH HARQ-ACK power control according to this embodiment.

TABLE 7

| | Pcell PDSCH in subframe n | Scell PDSCH in subframe n | Power control for PUCCH in subframe n + 4 |
|---|---|---|---|
| Example 1 | Yes | No | A first power control loop (for PUCCH format 1a/1b). |
| Example 2 | No | Yes | A second power control loop (for PUCCH format 1a/1b). |

TABLE 7-continued

| Pcell PDSCH in subframe n | Scell PDSCH in subframe n | Power control for PUCCH in subframe n + 4 |
|---|---|---|
| Example 3 | Yes | Yes | A second power control loop (for PUCCH format 3). |

In this example, the TPC command transmitted in the Scell PDCCH (DL assignment) scheduling the Scell PDSCH is used for closed-loop power control for PUCCH in Examples 2 and 3, while the TPC command transmitted in the Pcell PDCCH (DL assignment) scheduling the Pcell PDSCH is used for closed-loop power control for the PUCCH format 1a/1b transmissions associated with Example 1.

The first power control is intended to facilitate reliable reception of the PUCCH format 1a/1b at the Pcell, while the second power control is intended to facilitate reliable reception of the PUCCH format 3 at the Scell as shown in TABLE 4.

Figure 11A:
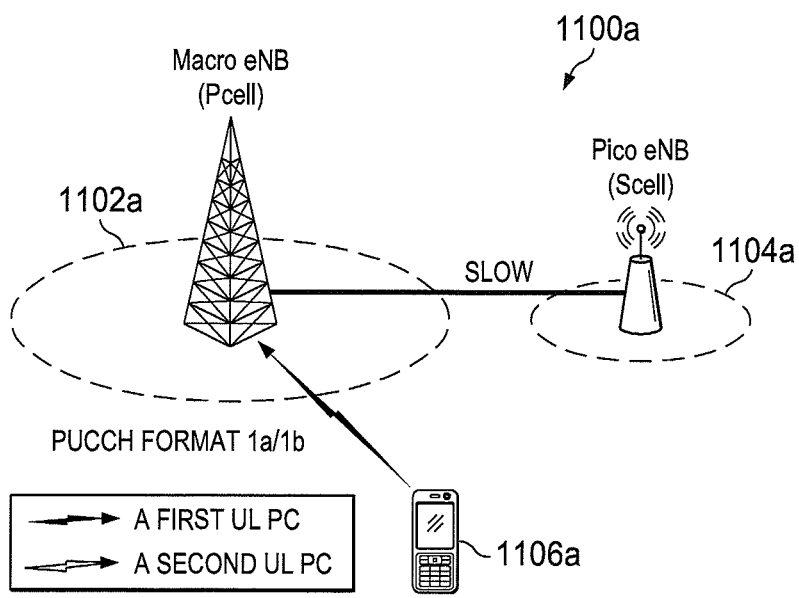
FIGS. 11A through 11C illustrate example systems with a macro eNB as a Pcell and a pico eNB as an Scell according to this disclosure.
Figure 11B:
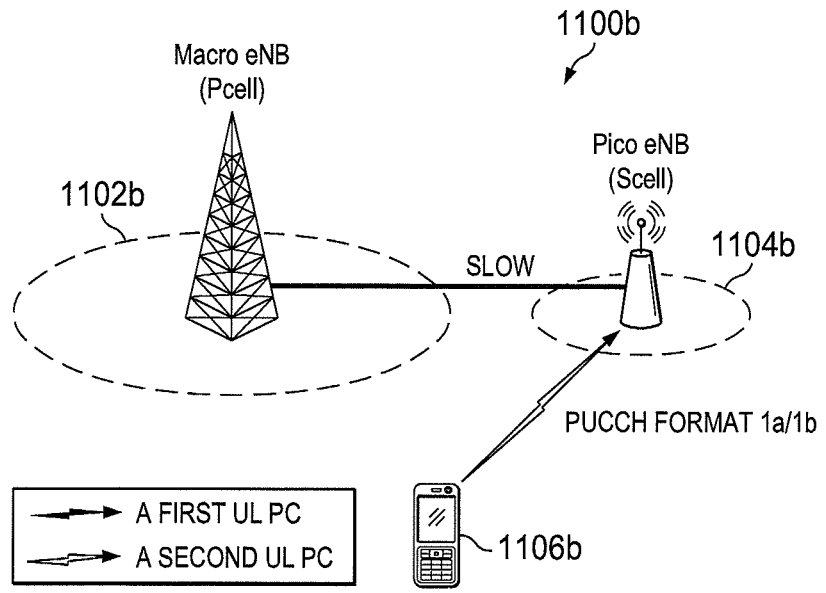
Figure 11C:
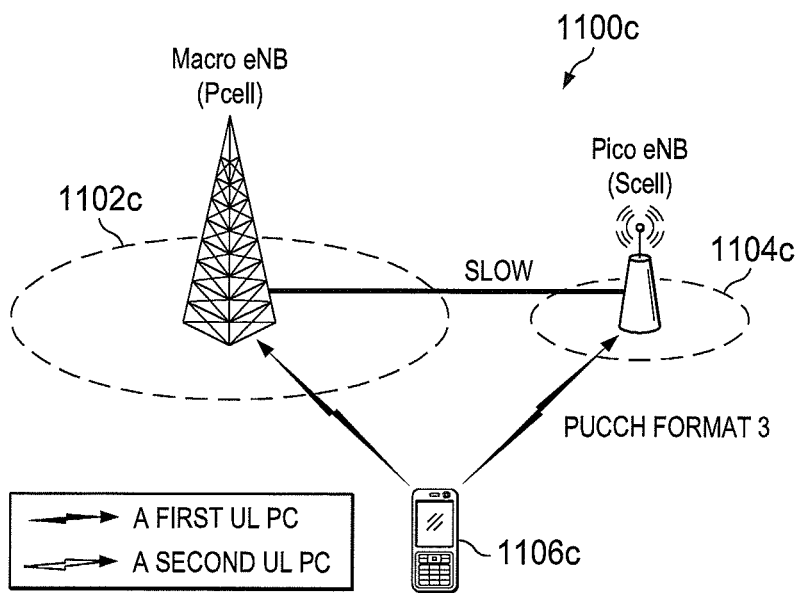

FIGS. 11A through 11C illustrate example systems 1100a-1100c with a macro eNB as a Pcell 1102a-1102c and a pico eNB as an Scell 1104a-1104c according to this disclosure. Note, however, that the macro and pico eNBs could be reversed. In this example, the Pcell 1102a-1102c handles the mobility, and the Scell 1104a-1104c handles data transmission/reception and PHY control signaling. However, when a UE 1106a-1106c transmits/receives signals from/to the pico cell more frequently than the macro cell, the less efficient PUCCH format 3 resource is heavily used, and this may incur substantial UL overhead.

In order to facilitate reception of PUCCHs in two different sites (cells), this embodiment considers that a UE applies the power control mechanism according to TABLE 5 as in the embodiment as shown in FIGS. 9a through 9C.

In another embodiment, denoted as Method 3, HARQ-ACK transmissions of an FDD UE may be configured with PUCCH format 3. In order to resolve the issues identified above, Method 3 considers that a UE configured with multiple (such as 2) serving cells located in the different sites as in FIGS. 6A and 6C and also configured with PUCCH format 3 could transmit HARQ-ACK according to Table 8, which is different from TABLE 2 and TABLE 6 in that it handles Example 1 differently, i.e., PUCCH format 3 is used in Example 1 instead of PUCCH format 1a/1b. TABLE 8 shows PUCCH HARQ-ACK transmissions according to Method 3.

TABLE 8

| | Pcell's PDSCH in subframe n | Scell's PDSCH in subframe n | PUCCH HARQ-ACK in subframe n + 4 |
|---|---|---|---|
| Example 1 | Yes | No | PUCCH format 3, RRC configured. |
| Example 2 | No | Yes | PUCCH format 1a/1b, $n_{PUCCH,2}^{(1,\tilde{p}0)} = n_{CCE,2} + N_{PUCCH,2}^{(1)}$ |
| Example 3 | Yes | Yes | PUCCH format 3, RRC configured. |

Method 3 may be applicable in a scenario where the Pcell is a macro cell and the Scell is a pico cell, and the Pcell carries infrequent RRC configurations and mobility control signaling while Scell carries dynamic scheduling of PDSCHs for user data transmissions.

Although Method 3 is described in terms of Pcell and Scell, the same functionality is generally applicable when Pcell is replaced with "first serving cell" and Scell is replaced with "second serving cell" or when Pcell and Scell are swapped. In case of inter-eNB CoMP in FIGS. 6C and 6D, the Pcell and the Scell in TABLE 6 may be replaced with a first TP and a second TP, respectively.

In TABLE 8, PUCCH format 1a/1b associated with Example 2 is coupled with a PDCCH scheduling PDSCH in the Scell. The PUCCH format 1a/1b resource is determined by $n_{PUCCH,2}^{(1,\tilde{p}0)} = n_{CCE,2} + N_{PUCCH,2}^{(1)}$, where $n_{CCE,2}$ is the smallest CCE index used to transmit the PDCCH.

In TABLE 8, a single PUCCH format 3 resource $n_{PUCCH}^{(3,\tilde{p})}$ (or a pair of PUCCH format 3 resources in case the PUCCH format 3 transmission is configured with two antenna ports) is RRC configured for Example 1 and Example 3 where the UE receives at least one PDSCH from the Pcell in subframe n.

In some embodiments, a HARQ-ACK bit sequence (and, in general, UCI bit sequence) for PUCCH format 3 can be generated in the same manner as in Method 1.

There are alternatives to allocate the PUCCH format 1a/1b resource and the PUCCH format 3 resource in TABLE 8 to different UL cells. A UE is assumed to be configured with two pairs of a DL cell and a UL cell, DL/UL Pcell and DL/UL Scell, respectively.

In a first alternative, all the PUCCH formats are transmitted on the UL Pcell. In a second alternative, the PUCCH format 3 is mapped on the Pcell, and PUCCH format 1a/1b resource associated with Example 2 is mapped on the UL Scell. In this example, UL control signaling for PDSCH in an Scell goes to the corresponding UL serving cell. In a third alternative, all the PUCCH formats are mapped on the UL Scell. In a fourth alternative, PHY UL Pcell is RRC configurable, and all the PUCCHs are mapped onto the configured UL Pcell.

For uplink frequency reuse (or area splitting), a UE specific configuration of PUCCH virtual cell ID(s) (VCID) can be considered for the application of UL CoMP. When a PUCCH VCID is configured for a PUCCH, the PUCCH VCID is used to replace a physical cell ID ($N_{ID}^{cell}$) in uplink base sequence generation and hopping for the PUCCH.

In one method, three separate PUCCH virtual cell IDs ($n_{ID}^{PUCCH}$) are respectively RRC configured for the two PUCCH formats (one PUCCH format 1a/1b in Example 2 and one PUCCH format 3 resource) used in TABLE 8.

In another method, for the PUCCH associated with the Scell (i.e., PUCCH format 1a/1b in Example 1), a physical cell ID ($N_{ID}^{cell}$) is used for base sequence generation and hopping. For the PUCCHs associated with Pcell (i.e., PUCCH format 3), an RRC configured virtual cell ID ($n_{ID}^{PUCCH}$) is used.

In another method, for PUCCH format 1a/1b, a physical cell ID ($N_{ID}^{cell}$) is used for base sequence generation and hopping. For the PUCCH format 3, an RRC configured virtual cell ID ($n_{ID}^{PUCCH}$) is used.

In the above methods, for each PUCCH VCID, a corresponding PUCCH format 1a/1b resource offset, $N_{PUCCH}^{(1)}$, can be configured.

Figure 12A:
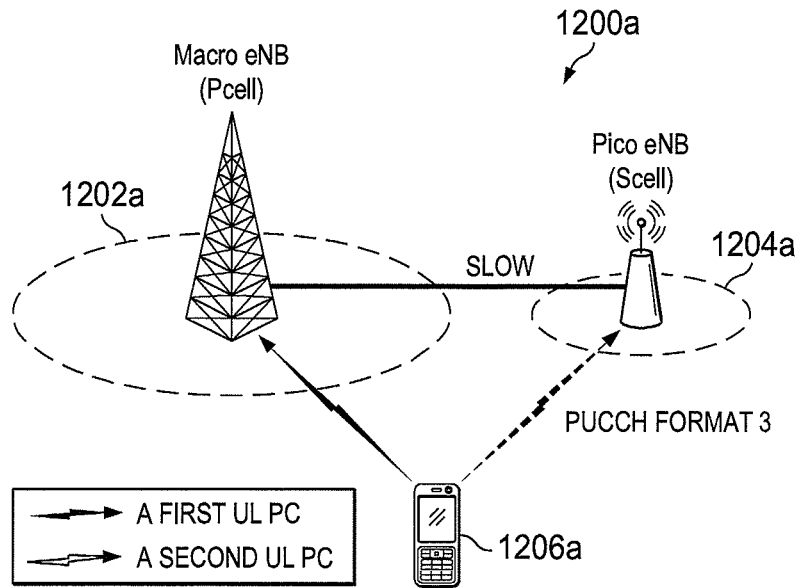
FIGS. 12A through 12C illustrate example systems with a macro eNB as a Pcell and a pico eNB as an Scell according to this disclosure.
Figure 12B:
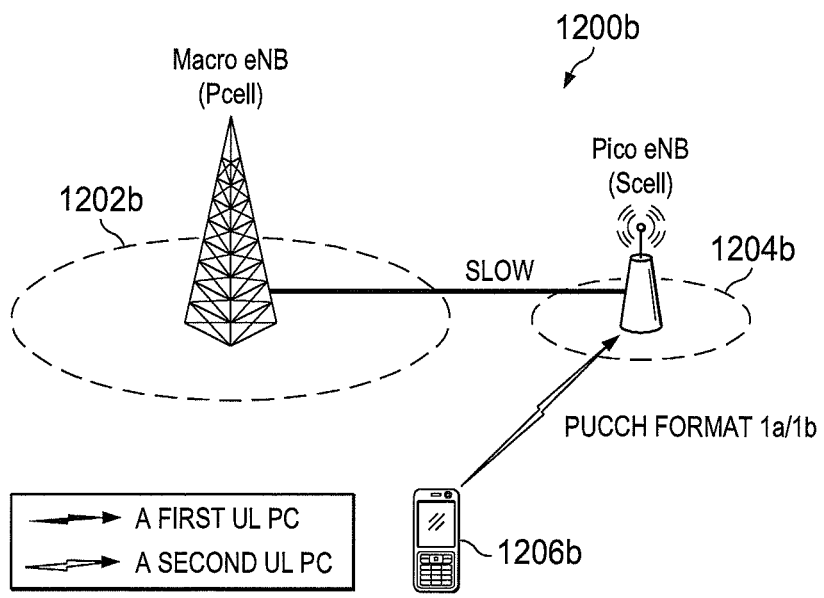
Figure 12C:
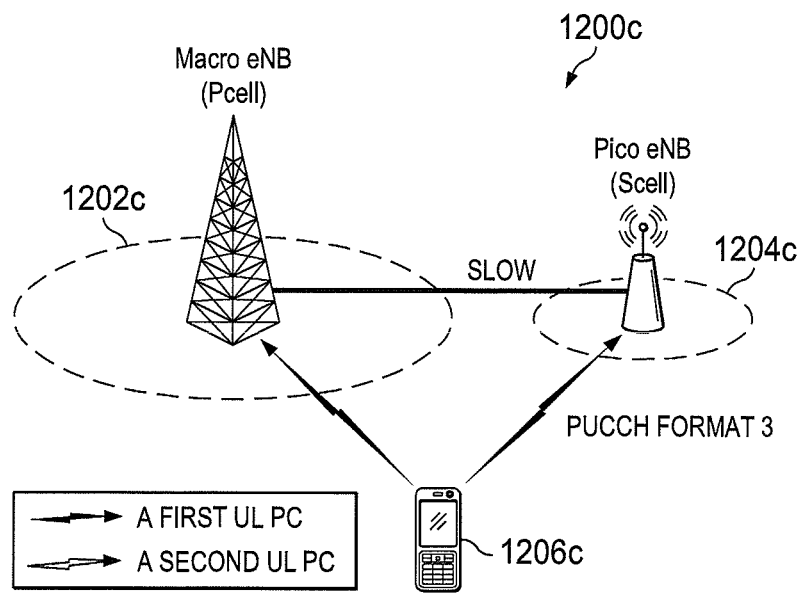

FIGS. 12A through 12C illustrate example systems 1200a-1200c with a macro eNB as a Pcell 1202a-1202c and a pico eNB as an Scell 1204a-1204c according to this disclosure. In some embodiments, Pcell 1202a-1202c is a macro cell, and Scell 1204a-1204c is a pico cell. Pcell 1202a-1202c handles the mobility, and Scell 1204a-1204c handles data transmission/reception and PHY control signaling. In order to facilitate reception of PUCCHs in two different sites (cells), a UE 1206a-1206c can apply a power control mechanism according to TABLE 9. TABLE 9 shows PUCCH HARQ-ACK power control according to this embodiment.

TABLE 9

| | Pcell PDSCH in subframe n | Scell PDSCH in subframe n | Power control for PUCCH in subframe n + 4 |
|---|---|---|---|
| Example 1 | Yes | No | A first power control loop (for PUCCH format 3). |
| Example 2 | No | Yes | A second power control loop (for PUCCH format 1a/1b). |
| Example 3 | Yes | Yes | A first power control loop (for PUCCH format 3). |

In accordance with the power control mechanism in TABLE 9, a TPC command transmitted in the Scell PDCCH (DL assignment) scheduling the Scell PDSCH is used for closed-loop power control for PUCCH in Example 2, where the UE receives only an Scell PDSCH. Conversely, the TPC command transmitted in the Pcell PDCCH (DL assignment) scheduling the Pcell PDSCH is used for closed-loop power control for the PUCCH format 3 transmissions associated with Examples 1 and 3.

The first power control is intended to facilitate reliable reception of the PUCCH format 1a/1b at the Pcell, while the second power control is intended to facilitate reliable reception of the PUCCH format 3 at the Scell as shown in TABLE 4.

In still another embodiment, the power control mechanism for PUCCH format 3 transmissions to both the Pcell and the Scell (Example 3) considers respective power control mechanisms for (actual or virtual) PUCCH format 3 transmissions to both the Pcell and the Scell (instead of only to the Pcell or only to the Scell as in TABLES 5, 7, and 9 for Example 3). Although the power control mechanism previously described for Example 3 (first or second power control mechanism) can typically suffice, this may not always be the example. For example, for Method 1, a PUCCH format 3 transmission power required to provide a target reception reliability, such as a Block Error Rate (BLER), at the Pcell can be typically larger than the one at the Scell since a UE with a connection to the Scell is typically located closer to the Scell pico eNB than to the Pcell macro eNB (as in Scenario B). However, distance to an eNB may not always be smaller for the Scell and, more likely, a location of the UE can be such that it has a smaller shadowing to the Pcell macro eNB than to the Scell pico eNB (for example, due to the relative height location of the two eNBs or due to different signal propagation paths).

To ensure that a PUCCH transmission intended for both the Pcell and the Scell is received at the respective eNBs with the target reliability, the PUCCH format 3 transmission power control loop for Example 3 can be modified so that a transmission power is computed to be the larger between the one required for achieving the target reception reliability at the Pcell and the one required for achieving the target reception reliability at the Scell. Therefore, for example 3, a UE can maintain two power control loops for PUCCH format 3 transmission—one power control loop for the Pcell (for example, the first power control loop in TABLE 4) and another power control loop for the Scell (for example, the second power control loop in TABLE 4).

A power control loop for transmission of PUCCH format 3 in subframe i can be as in Equation (1a) for the Pcell and as in Equation (1b) for the Scell. The parameters in Equation (1a) and Equation (1b) are as described in REF3.

$$P_{PUCCH,Pcell}(i) = \min(P_{CMAX,Pcell}(i), P_{0\_PUCCH} + PL_{Pcell} + h(n_{CQI}, n_{HARQ}, n_{SR}) + \Delta_{F\_PUCCH}(F) + \Delta_{TxD}(F') + g_{Pcell}(i)) \quad (1a)$$

$$P_{PUCCH,Scell}(i) = \min(P_{CMAX,Scell}(i), P_{0\_PUCCH} + PL_{Scell} + h(n_{CQI}, n_{HARQ}, n_{SR}) + \Delta_{F\_PUCCH}(F) + \Delta_{TxD}(F') + g_{Scell}(i)) \quad (1b)$$

For Example 3, a UE determines a transmission power of PUCCH format 3 in subframe i as max ($P_{PUCCH,Pcell}(i)$, $P_{PUCCH,Scell}(i)$). The closed-loop Transmission Power Control (TPC) command $\delta_{PUCCH,Pcell}$ or $\delta_{PUCCH,Scell}$ in the DCI format scheduling PDSCH and conveyed by the PDCCH transmitted from the Pcell or from the Scell and included in the term $g_{Pcell}(i)$ or $g_{Scell}(i)$, respectively, may not target transmission of PUCCH format 3 but actually target transmission of a respective PUCCH format 1a/1b (depending on whether Method 1, 2, or 3 is used as they were previously described). This is because an eNB knows only its own PDSCH scheduling decision and does not know the PDSCH scheduling decision of the other eNB. Nevertheless, the UE could always includes $\delta_{PUCCH,Pcell}$ or $\delta_{PUCCH,Scell}$ in computing $g_{Pcell}(i)$ or $g_{Scell}(i)$, respectively, regardless of whether it transmits PUCCH format 3 or PUCCH format 1a/1b, as each TPC command intends to adjust the transmission power according to the short-term fading conditions the UE experiences or adjust for errors in setting the open loop component of the power control loop mechanisms.

Although FIGS. 4 through 12C have illustrated various deployment scenarios, cells, and systems, various changes may be made to these figures. For example, these figures are meant to illustrate examples of the types of deployment scenarios, cells, and systems that could be used. These figures do not limit the scope of this disclosure to any particular deployment scenario, cell, or system.

Figure 13:
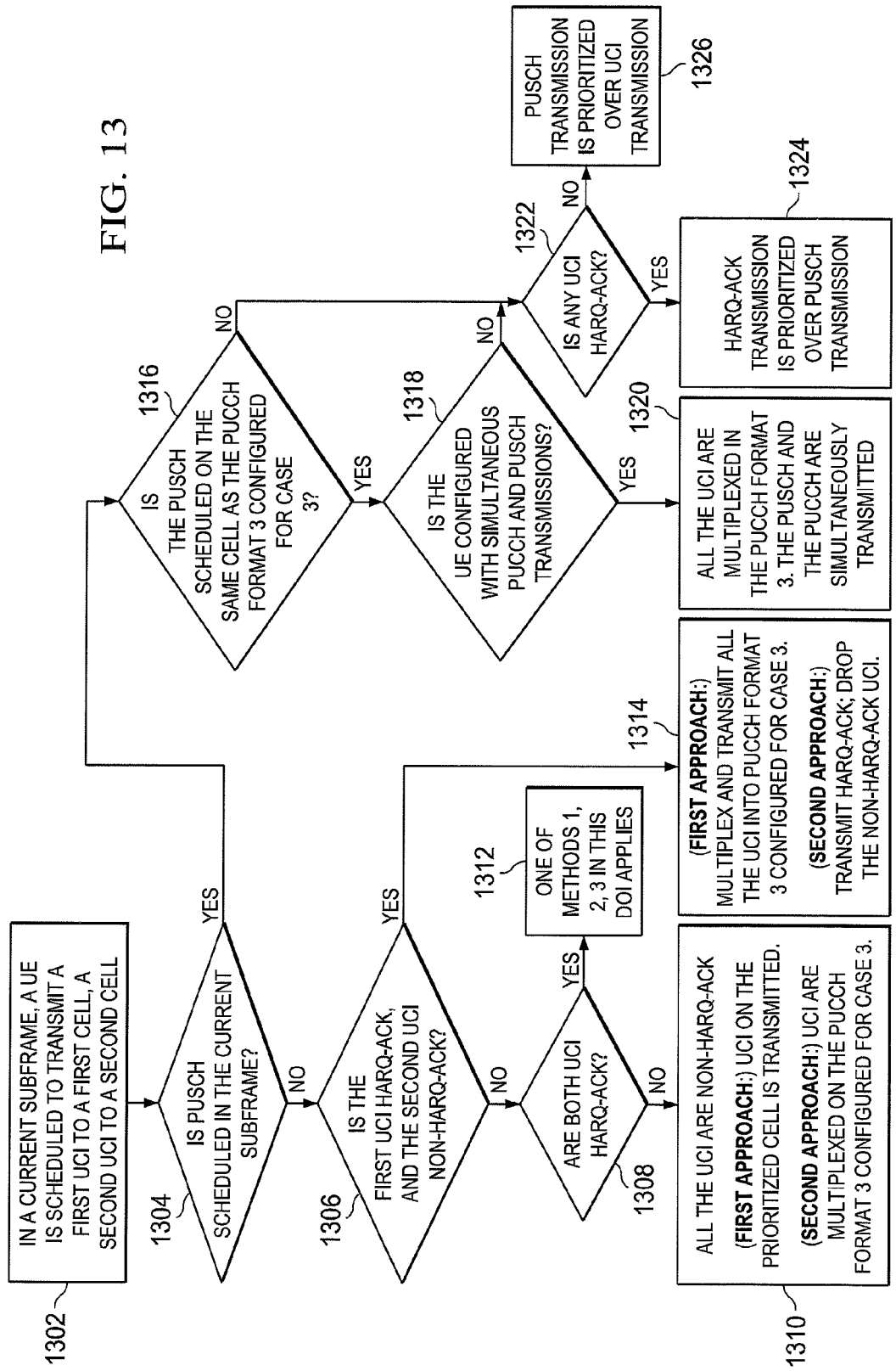
FIGS. 13 and 14 illustrate example processes for managing uplink control information in a wireless network according to this disclosure.
Figure 14:
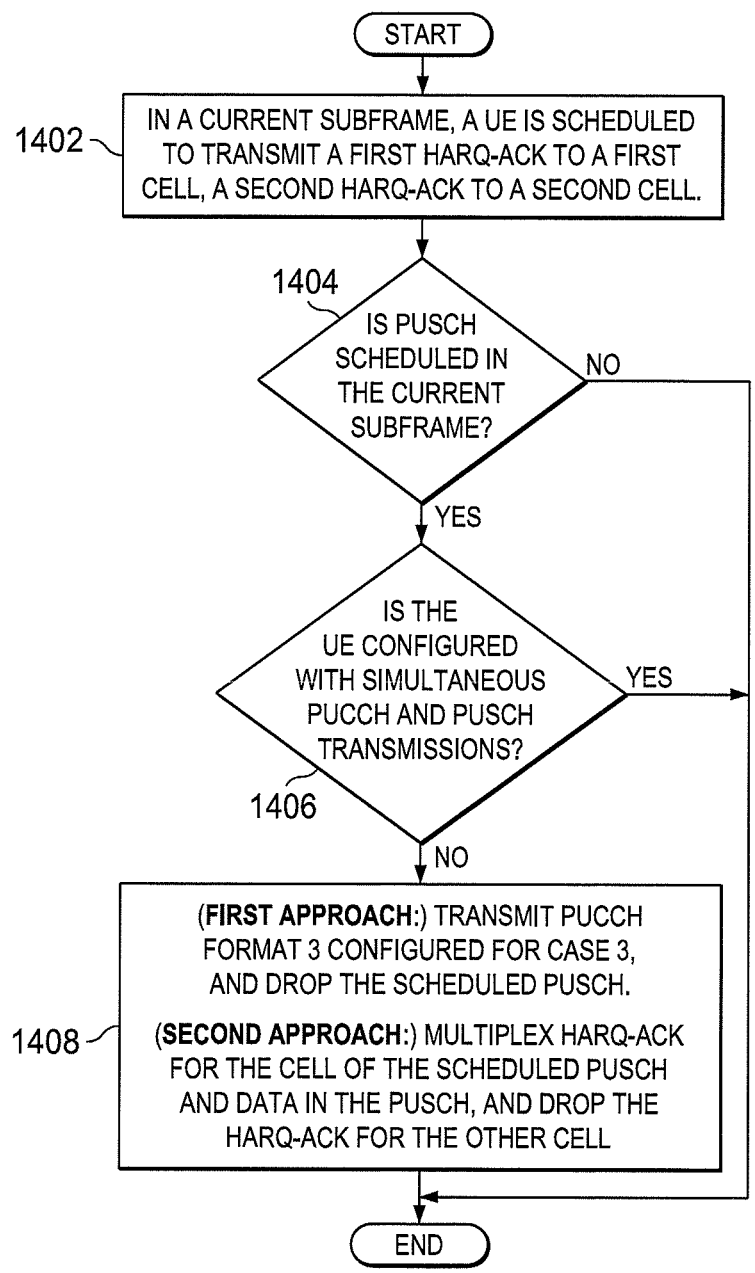

FIGS. 13 and 14 illustrate example processes for managing uplink control information in a wireless network according to this disclosure. The processes depicted here could be used by any suitable devices, such as the eNBs and UEs in FIGS. 6A through 6C.

As shown in FIG. 13, in one embodiment, a UE is scheduled to transmit a first UCI to a first cell and a second UCI to a second cell in a current subframe (step 1302). A determination is made to whether a PUSCH is scheduled in the current subframe (step 1304). If a PUSCH is not scheduled, a determination is made to whether the first UCI is HARQ-ACK and the second UCI is non HARQ-ACK (step 1306). In other words, a UE needs to transmit in the same subframe a first UCI type to the Pcell and a second UCI type to the Scell, where one of the UCI types is HARQ-ACK and the other UCI type is not HARQ-ACK and with the UE not having a PUSCH transmission in the subframe. For example, in a given subframe, a UE may need to transmit HARQ-ACK to the Scell and periodic CSI to the Pcell.

If this is not the case, a determination is made to whether both UCIs are HARQ-ACK (step 1308). If not all of the UCIs are HARQ-ACK, all of the UCIs are non HARQ-ACK, and one of two approaches may be taken (step 1310).

In a first approach, due to an existence of the UCI type other than HARQ-ACK, the UE operates as in Example 3, instead of as in Example 1 or as in Example 2. In general, when a UE needs to transmit HARQ-ACK in at least one cell and also needs to transmit UCI (of any type) in another cell, the UE uses PUCCH format 3 to multiplex all UCI as in Example 3. The multiplexing of different UCI types in Format 3 can be as previously described.

In a second approach, the UE prioritizes HARQ-ACK transmission to a first cell and drops the transmission of other UCI types to a second cell. For example, this approach can be selected when a UE is power limited and cannot support an increased information payload in PUCCH format 3 with a target reception reliability (BLER).

If both UCIs are HARQ-ACK in step 1308, the process performs HARQ-ACK transmission of an FDD UE configured with PUCCH format 3 (step 1312). In other words, if the UE needs to transmit HARQ-ACK to the two cells, one of Methods 1, 2, and 3 in this disclosure may apply.

If, in step 1306, the first UCI is HARQ-ACK and the second UCI is non HARQ-ACK, two approaches apply (step 1314). If the UE needs to transmit non-HARQ-ACK to the two cells, in a first approach the UE multiplexes the UCI onto PUCCH format 3 configured for Example 3 and transmit the PUCCH format 3. In one method, a UE utilizes a PCID in transmitting PUCCH format 2, and the UE utilizes a VCID in transmitting PUCCH format 3, for base sequence and hopping sequence generation. In a second approach, the UE prioritizes the UCI on the Pcell; for example, the UE transmits PUCCH on the Pcell to transmit the UCI intended for the Pcell and drops the UCI intended to the Scell If, in step 1304, a PUSCH is scheduled in the current subframe, a determination is made whether the PUSCH is scheduled on the same cell as the PUCCH format 3 configured for Example 3 as shown above (step 1316). If PUSCH is scheduled on the same cell, a determination is made whether the UE is configured with simultaneous PUCCH and PUSCH transmissions (step 1318). If yes, all of the UCIs are multiplexed in the PUCCH format 3, and the PUSCH and the PUCCH are simultaneously transmitted (step 1320).

If, in step 1316, the PUSCH is not scheduled on the same cell, a determination is made whether there are any UCI HARQ-ACK (step 1322). If so, HARQ-ACK transmissions are prioritized over PUSCH transmissions (step 1324). If not, the PUSCH transmissions are prioritized over the UCI transmissions (step 1326). If, in step 1318, the UE is not configured with simultaneous PUCCH and PUSCH transmissions, the process moves to step 1322. In other words, a UE may need to transmit a PUSCH as well as UCI to a first cell and UCI to a second cell in the same subframe. If the PUSCH transmission is for the same cell as the cell of PUCCH format 3 transmission for Example 3 and the UE is capable of simultaneously transmitting PUSCH and PUCCH in the same cell, the UE can transmit the UCI for the second cell using PUCCH format 3 for Example 3. If the PUSCH is for a different cell than the cell of PUCCH format 3 transmission for Example 3, the UE can prioritize HARQ-ACK transmission, if any. Otherwise, if the UCI does not include HARQ-ACK, the UE can prioritize PUSCH transmission.

As shown in FIG. 14, in one embodiment, a UE is scheduled to transmit a first HARQ-ACK to a first cell and a second HARQ-ACK to a second cell in a current subframe (step 1402). A determination is made whether a PUSCH is scheduled in the current subframe (step 1404). If so, a determination is made whether the UE is configured with simultaneous PUCCH and PUSCH transmissions (step 1406).

If not, two approaches may be taken (step 1408). In some embodiments, a UE has PUSCH transmission in a cell's subframe where HARQ-ACK needs to be transmitted to both the Pcell and the Scell and the UE is not configured to simultaneously transmit PUSCH and PUCCH in the same cell. In a first approach, the UE can transmit PUCCH format 3 to convey HARQ-ACK to both the Pcell and the Scell and suspend the PUSCH transmission. In a second approach, the UE can multiplex HARQ-ACK and data in the PUSCH (for the cell of the PUSCH transmission) and drop the HARQ-ACK transmission to the other cell. The two approaches are approximately equivalent as they are both likely to result in a retransmission (PUSCH retransmission for the first approach, and PDSCH retransmission from the second approach). The first approach prioritizes PDSCH receptions, while the second approach prioritizes PUSCH transmissions.

Although FIGS. 13 and 14 illustrate examples of processes for managing uplink control information in a wireless network, various changes may be made to FIGS. 13 and 14. For example, while shown as a series of steps, various steps in each figure could overlap, occur in parallel, occur in a different order, or occur multiple times. As a particular example, the conditional blocks in each figure could be rearranged in a different order.

In some embodiments, various functions described above are implemented or supported by computer programs, each of which is formed from computer readable program code and embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Although this disclosure has been described with an exemplary embodiment, various changes and modifications may be suggested to one skilled in the art. It is intended that this disclosure encompass such changes and modifications as fall within the scope of the appended claims.

What is claimed is:

1. An apparatus, for use in a wireless communication network, comprising:
 a user equipment (UE) configured to communicate with a plurality of serving cells with at least a first serving cell and a second serving cell, the UE configured to operate in at least two carrier frequencies;
 the UE comprising:
 a main processor configured to detect one or more scheduling assignments for receiving one or more respective physical downlink shared channels (PDSCHs) from a respective one or more of the plurality of serving cells;
 a receiver processing circuitry configured to receive the one or more PDSCHs from the respective one or more of the plurality of serving cells based on the one or more scheduling assignments; and
 a transmitter processing circuitry configured to transmit hybrid automatic repeat request acknowledgment (HARQ-ACK) information on a physical uplink control channel (PUCCH) in response to receiving the one or more PDSCHs;
 wherein the main processor is configured to utilize a first power control loop to determine an uplink transmission power for the PUCCH when the UE receives PDSCH only from the first serving cell, the first power control loop configured to use a path-loss reference derived from a received power of a reference signal transmitted in the first serving cell, a transmission power control (TPC) command of a TPC field included in a scheduling assignment for the PDSCH reception in the first serving cell, and a first set of open loop power control parameters; and wherein the main processor is configured to utilize a second power control loop to determine an uplink transmission power for the PUCCH when the UE receives PDSCH at least from the second serving cell, the second power control loop configured to use a path-loss reference derived from a received power of a reference signal transmitted in the second serving cell, a TPC command of a TPC field included in a scheduling assignment for the PDSCH reception in the second serving cell, and a second set of open loop power control parameters.

2. The apparatus of claim 1, wherein:

the processing circuitry is further configured to receive a configuration of a PUCCH format 3 resource configured by a radio resource control (RRC);

the PUCCH resource is a PUCCH format 1a/1b resource determined by $n_{PUCCH}^{(1,\tilde{p}_0)} = n_{CCE} + N_{PUCCH}^{(1)}$ when the UE detects a scheduling assignment for receiving PDSCH only from the first serving cell, wherein the scheduling assignment is conveyed by a physical downlink control channel (PDCCH) that is transmitted in a plurality of control channel elements (CCEs), $n_{CCE}$ is an index number of the smallest CCE, $\tilde{p}_0$ is an antenna port, and $N_{PUCCH}^{(1)}$ is configured by higher layers; and the PUCCH resource is the PUCCH format 3 resource when the UE detects a scheduling assignment for receiving PDSCH at least from the second serving cell.

3. The apparatus of claim 2, wherein the receiver processing circuitry is configured to receive a configuration of a first virtual cell identification (VCID) and a second VCID by a radio resource control (RRC); and wherein the main processor is configured to assign the first VCID to PUCCH format 1a/1b and the second VCID to PUCCH format 3.

4. The apparatus of claim 2, wherein the receiver processing circuitry is configured to receive a configuration of a virtual cell identification (VCID) by a radio resource control (RRC); and wherein the main processor is configured to assign a physical cell identification (ID) to PUCCH format 1a/1b and the VCID to PUCCH format 3.

5. The apparatus of claim 1, wherein the first serving cell is a primary serving cell and the second serving cell is a secondary serving cell.

6. The apparatus of claim 1, wherein the first serving cell is a secondary serving cell and the second serving cell is a primary serving cell.

7. A method for managing a hybrid automatic repeat request acknowledgment in a wireless network, the method comprising:

operating a user equipment (UE) in at least two carrier frequencies;

detecting one or more scheduling assignments for receiving one or more respective physical downlink shared channels (PDSCHs) from a respective one or more of the plurality of serving cells;

receiving the one or more PDSCHs from the respective one or more of the plurality of serving cells based on the one or more scheduling assignments;

transmitting hybrid automatic repeat request acknowledgment (HARQ-ACK) information on a physical uplink control channel (PUCCH) in response to receiving the one or more PDSCHs;

utilizing a first power control loop to determine an uplink transmission power for the PUCCH when the UE receives PDSCH only from the first serving cell, the first power control loop using a path-loss reference derived from a received power of a reference signal transmitted in the first serving cell, a transmission power control (TPC) command of a TPC field included in a scheduling assignment for the PDSCH reception in the first serving cell, and a first set of open loop power control parameters; and utilizing a second power control loop to determine an uplink transmission power for the PUCCH when the UE receives PDSCH at least from the second serving cell, the second power control loop using a path-loss reference derived from a received power of a reference signal transmitted in the second serving cell, a TPC command of a TPC field included in a scheduling assignment for the PDSCH reception in the second serving cell, and a second set of open loop power control parameters.

8. The method of claim 7, further comprising:

receiving a configuration of a PUCCH format 3 resource configured by a radio resource control (RRC);

wherein the PUCCH resource is a PUCCH format 1a/1b resource determined by $n_{PUCCH}^{(1,\tilde{p}_0)} = n_{CCE} = N_{PUCCH}^{(1)}$ when the UE detects a scheduling assignment for receiving PDSCH only from the first serving cell, wherein the scheduling assignment is conveyed by a physical downlink control channel (PDCCH) that is transmitted in a plurality of control channel elements (CCEs), $n_{CCE}$ is an index number of the smallest CCE, $\tilde{p}_0$ is an antenna port, and $N_{PUCCH}^{(1)}$ is configured by higher layers; and wherein the PUCCH resource is the PUCCH format 3 resource when the UE detects a scheduling assignment for receiving PDSCH at least from the second serving cell.

9. The method of claim 8, further comprising:

receiving a configuration of a first virtual cell identification (VCID) and a second VCID by a radio resource control (RRC); and assigning the first VCID to PUCCH format 1a/1b and the second VCID to PUCCH format 3.

10. The method of claim 8, further comprising:

receiving a configuration of a virtual cell identification (VCID) by a radio resource control (RRC); and assigning a physical cell identification (ID) to PUCCH format 1a/1b and the VCID to PUCCH format 3.

11. The method of claim 7, wherein the first serving cell is a primary serving cell and the second serving cell is a secondary serving cell.

12. The method of claim 7, wherein the first serving cell is a secondary serving cell and the second serving cell is a primary serving cell.

13. The method of claim 7, further comprising:

sending by the first serving cell a message to the second serving cell, the message comprising UE-specific information;

wherein the UE-specific information comprises at least one of: a number of transport blocks in a first serving cell transmission mode, a first serving cell transmission mode, and a number of HARQ-ACK bits reserved for the first serving cell; and wherein the UE-specific message comprises periodic channel state information transmission parameters to the first serving cell and schedule request reporting subframes to the first serving cell.

14. The method of claim 7, further comprising:
sending by the second serving cell a message to the first serving cell, the message comprising UE-specific information for PUCCH format 3 transmission.

15. The method of claim 14, wherein the UE-specific information comprises at least one of: a respective scrambling sequence and a resource index $n_{PUCCH}^{(3,\tilde{p})}$ configured by the second serving cell, wherein p is an antenna port.

16. A non-transitory computer readable medium embodying computer readable program code for performing a method that comprises:
operating a user equipment (UE) in at least two carrier frequencies;
detecting one or more scheduling assignments for receiving one or more respective physical downlink shared channels (PDSCHs) from a respective one or more of the plurality of serving cells;
receiving the one or more PDSCHs from the respective one or more of the plurality of serving cells based on the one or more scheduling assignments;
transmitting hybrid automatic repeat request acknowledgment (HARQ-ACK) information on a physical uplink control channel (PUCCH) in response to receiving the one or more PDSCHs;
utilizing a first power control loop to determine an uplink transmission power for the PUCCH when the UE receives PDSCH only from the first serving cell, the first power control loop using a path-loss reference derived from a received power of a reference signal transmitted in the first serving cell, a transmission power control (TPC) command of a TPC field included in a scheduling assignment for the PDSCH reception in the first serving cell, and a first set of open loop power control parameters; and
utilizing a second power control loop to determine an uplink transmission power for the PUCCH when the UE receives PDSCH at least from the second serving cell, the second power control loop using a path-loss reference derived from a received power of a reference signal transmitted in the second serving cell, a TPC command of a TPC field included in a scheduling assignment for the PDSCH reception in the second serving cell, and a second set of open loop power control parameters.

17. An apparatus, for use in a wireless communication network, comprising:
an eNodeB configured to communicate with a user equipment (UE) on at least one of two or more carrier frequencies, the eNodeB comprising a plurality of serving cells comprising at least a first serving and a second serving cell;
the eNodeB comprising:
a transmitter processing circuitry configured to transmit one or more scheduling assignments for one or more respective physical downlink shared channels (PDSCHs) to the UE and transmit the one or more PDSCHs to the UE based on the one or more scheduling assignments; and
a receiver processing circuitry configured to receive hybrid automatic repeat request acknowledgment (HARQ-ACK) information on a physical uplink control channel (PUCCH) in response to the UE receiving the one or more PDSCHs;
a main processor configured to:
utilize a first power control loop to determine an uplink transmission power for the PUCCH when the UE receives PDSCH only from the first serving cell, the first power control loop configured to use a path-loss reference derived from a received power of a reference signal transmitted in the first serving cell, a transmission power control (TPC) command of a TPC field included in a scheduling assignment for the PDSCH reception in the first serving cell, and a first set of open loop power control parameters; and
utilize a second power control loop to determine an uplink transmission power for the PUCCH when the UE receives PDSCH at least from a second serving cell, the second power control loop configured to use a path-loss reference derived from a received power of a reference signal transmitted in the second serving cell, a TPC command of a TPC field included in a scheduling assignment for the PDSCH reception in the second serving cell, and a second set of open loop power control parameters.

18. The apparatus of claim 17, wherein:
the processing circuitry is further configured to transmit a configuration of a PUCCH format 3 resource configured by a radio resource control (RRC);
the PUCCH resource is a PUCCH format 1a/1b resource determined by $n_{PUCCH}^{(1,\tilde{p}_0)} = n_{CCE} + N_{PUCCH}^{(1)}$ when the UE detects a scheduling assignment for receiving PDSCH only from the first serving cell, wherein the scheduling assignment is conveyed by a physical downlink control channel (PDCCH) that is transmitted in a plurality of control channel elements (CCEs), $n_{CCE}$ is an index number of the smallest CCE, $\tilde{p}_0$ is an antenna port, and $N_{PUCCH}^{(1)}$ is configured by higher layers; and
the PUCCH resource is the PUCCH format 3 resource when the UE detects a scheduling assignment for receiving PDSCH at least from the second serving cell.

19. The apparatus of claim 18,
wherein the transmitter processing circuitry is configured to transmit a configuration of a first virtual cell identification (VCID) and a second VCID by a radio resource control (RRC), and
wherein the UE is configured to assign the first VCID to PUCCH format 1a/1b and the second VCID to PUCCH format 3.

20. The apparatus of claim 18,
wherein the transmitter processing circuitry is configured to transmit a configuration of a virtual cell identification (VCID) by a radio resource control (RRC), and
wherein the UE is configured to assign a physical cell identification (ID) to PUCCH format 1a/1b and the VCID to PUCCH format 3.

* * * * *